US009762551B2

(12) United States Patent
Huxham et al.

(10) Patent No.: US 9,762,551 B2
(45) Date of Patent: *Sep. 12, 2017

(54) SMALL FORM-FACTOR CRYPTOGRAPHIC EXPANSION DEVICE

(71) Applicant: Visa International Service Association, San Francisco, CA (US)

(72) Inventors: Horatio Nelson Huxham, Cape Town (ZA); Alan Joseph O'Regan, Cape Town (ZA)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,386

(22) Filed: Jul. 21, 2016

(65) Prior Publication Data

US 2017/0099265 A1 Apr. 6, 2017

Related U.S. Application Data

(63) Continuation of application No. 13/875,985, filed on May 2, 2013, now Pat. No. 9,426,127.

(Continued)

(51) Int. Cl.
*H04L 29/06* (2006.01)
*H04L 9/06* (2006.01)

(52) U.S. Cl.
CPC ........ *H04L 63/0428* (2013.01); *H04L 9/0625* (2013.01); *H04L 9/0631* (2013.01)

(58) Field of Classification Search
CPC ...... H04W 12/02; H04W 12/04; H04L 63/04; H04L 63/0428; H04L 63/08; H04L 63/0853
See application file for complete search history.

(56) References Cited

U.S. PATENT DOCUMENTS 3,877,808 A 4/1975 Jasperson, Jr.
5,892,900 A 4/1999 Ginter et al.
(Continued)

FOREIGN PATENT DOCUMENTS

CN 2845170 Y 12/2006
CN 101193135 A 6/2008
(Continued)

OTHER PUBLICATIONS

International Search Report and Written Opinion mailed Jan. 17, 2013 for PCT Patent Application No. PCT/US2012/047693.
(Continued)

*Primary Examiner* — Saleh Najjar
*Assistant Examiner* — Devin Almeida
(74) *Attorney, Agent, or Firm* — Kilpatrick Townsend & Stockton LLP

(57) ABSTRACT

A cryptographic expansion device that can be attached to a communication component of a communication device to enable the communication device to perform cryptographic operations on communications sent to and from the communication device is described. The cryptographic expansion device can be a small-form factor cryptographic expansion device that can be used with a small-form factor communication component such as a micro-SIM (subscriber identity module) card. When used with a communication device, the cryptographic expansion device enables the communication device to send and received end-to-end secure encrypted communications. The end-to-end secure communications enabled by the cryptographic expansion device can be utilized by a user of the communication device to perform financial and/or banking transactions.

19 Claims, 9 Drawing Sheets

Related U.S. Application Data

(60) Provisional application No. 61/641,686, filed on May 2, 2012.

(56) References Cited

U.S. PATENT DOCUMENTS

| | | |
|---|---|---|
| 6,944,478 B1 | 9/2005 | Durand |
| 7,291,019 B2 | 11/2007 | Nishizawa et al. |
| 7,380,125 B2 | 5/2008 | Di Luoffo et al. |
| 7,991,434 B2 | 8/2011 | Yen et al. |
| 8,078,226 B2 | 12/2011 | Lo et al. |
| 8,275,312 B2 | 9/2012 | Fisher |
| 8,280,441 B2 | 10/2012 | Lo et al. |
| 8,290,433 B2 | 10/2012 | Fisher et al. |
| 8,332,272 B2 | 12/2012 | Fisher |
| 8,644,025 B2 | 2/2014 | Luo |
| 2002/0128983 A1* | 9/2002 | Wrona .................. G06Q 20/02 705/71 |
| 2004/0103283 A1 | 5/2004 | Hornak |
| 2006/0055506 A1 | 3/2006 | Nicolas |
| 2006/0074698 A1 | 4/2006 | Bishop et al. |
| 2006/0143446 A1* | 6/2006 | Frank .................... G06F 21/57 713/164 |
| 2006/0175416 A1 | 8/2006 | Ho |
| 2006/0175417 A1 | 8/2006 | Ho |
| 2006/0175418 A1 | 8/2006 | Ho |
| 2007/0040258 A1 | 2/2007 | Sheats |
| 2007/0124409 A1 | 5/2007 | Sibert |
| 2007/0131780 A1 | 6/2007 | Ho |
| 2007/0213096 A1 | 9/2007 | Bell et al. |
| 2007/0245413 A1 | 10/2007 | Andolina et al. |
| 2007/0262156 A1 | 11/2007 | Chen et al. |
| 2008/0029609 A1 | 2/2008 | Ho |
| 2008/0076474 A1 | 3/2008 | Ho |
| 2008/0083827 A1 | 4/2008 | Ho |
| 2008/0099559 A1 | 5/2008 | Lo et al. |
| 2008/0161051 A1 | 7/2008 | Schobbert et al. |
| 2008/0169640 A1 | 7/2008 | Scheir |
| 2009/0181721 A1 | 7/2009 | Nishizawa et al. |
| 2009/0200381 A1 | 8/2009 | Schober et al. |
| 2009/0227234 A1 | 9/2009 | Bosch et al. |
| 2010/0190528 A1 | 7/2010 | Hsiao et al. |
| 2010/0191602 A1 | 7/2010 | Mikkelsen et al. |
| 2010/0267419 A1 | 10/2010 | Nishizawa et al. |
| 2011/0022835 A1 | 1/2011 | Schibuk |
| 2011/0103586 A1 | 5/2011 | Nobre |
| 2011/0105183 A1 | 5/2011 | Hsiao et al. |
| 2011/0149533 A1* | 6/2011 | Luo ........................ G06K 19/07 361/751 |
| 2011/0315779 A1* | 12/2011 | Bidin ............... G06K 19/07745 235/492 |
| 2013/0189998 A1 | 7/2013 | Stewart |

FOREIGN PATENT DOCUMENTS

| | | |
|---|---|---|
| CN | 101193372 A | 6/2008 |
| CN | 101826164 A | 9/2010 |
| EP | 2239691 A1 | 10/2010 |
| JP | 2007/058572 A | 3/2007 |
| WO | 2009-044371 A1 | 4/2009 |
| WO | 2012/055726 A1 | 5/2012 |

OTHER PUBLICATIONS

International Search Report and Written Opinion issued on Mar. 25, 2013 for PCT Patent Application No. PCT/US2012/047645, 10 pages.

International Search Report and Written Opinion mailed May 2, 2013 for PCT Patent Application No. PCT/US2013/039252.

International Preliminary Report on Patentability mailed Jan. 30, 2014 for PCT Patent Application No. PCT/US2012/047693, 6 pages.

Non-Final Office Action dated Jul. 10, 2015 for U.S. Appl. No. 14/234,130, 22 pages.

Final Office Action dated Dec. 11, 2015 for U.S. Appl. No. 14/234,130, 27 pages.

Examination Report dated Oct. 16, 2015 for ARIPO Patent Application No. AP/P/2014/007428, 5 pages.

Examination Report dated Dec. 10, 2015 for ARIPO Patent Application No. AP/P/2014/007430, 6 pages.

Examination Report dated May 23, 2016 for ARIPO Patent Application No. AP/P/2014/007430, 3 pages.

International Search Report and Written Opinion mailed Sep. 17, 2013 for international Patent Application No. PCT/US2013/039252.

Non-Final Office Action dated Oct. 21, 2014 for U.S. Appl. No. 13/875,985, 17 pages.

Non-Final Office Action dated May 22, 2015 for U.S. Appl. No. 13/875,985, 12 pages.

Final Office Action dated Nov. 3, 2015 for U.S. Appl. No. 13/875,985, 12 pages.

Notice of Allowance mailed Apr. 25, 2016 in U.S. Appl. No. 13/875,985, 9 pages.

Office Action mailed Sep. 2, 2016 in U.S. Appl. No. 14/234,101, 9 pages.

* cited by examiner (PERSPECTIVE VIEW)

(TOP VIEW)

(CROSS SECTION VIEW)

(BOTTOM VIEW)

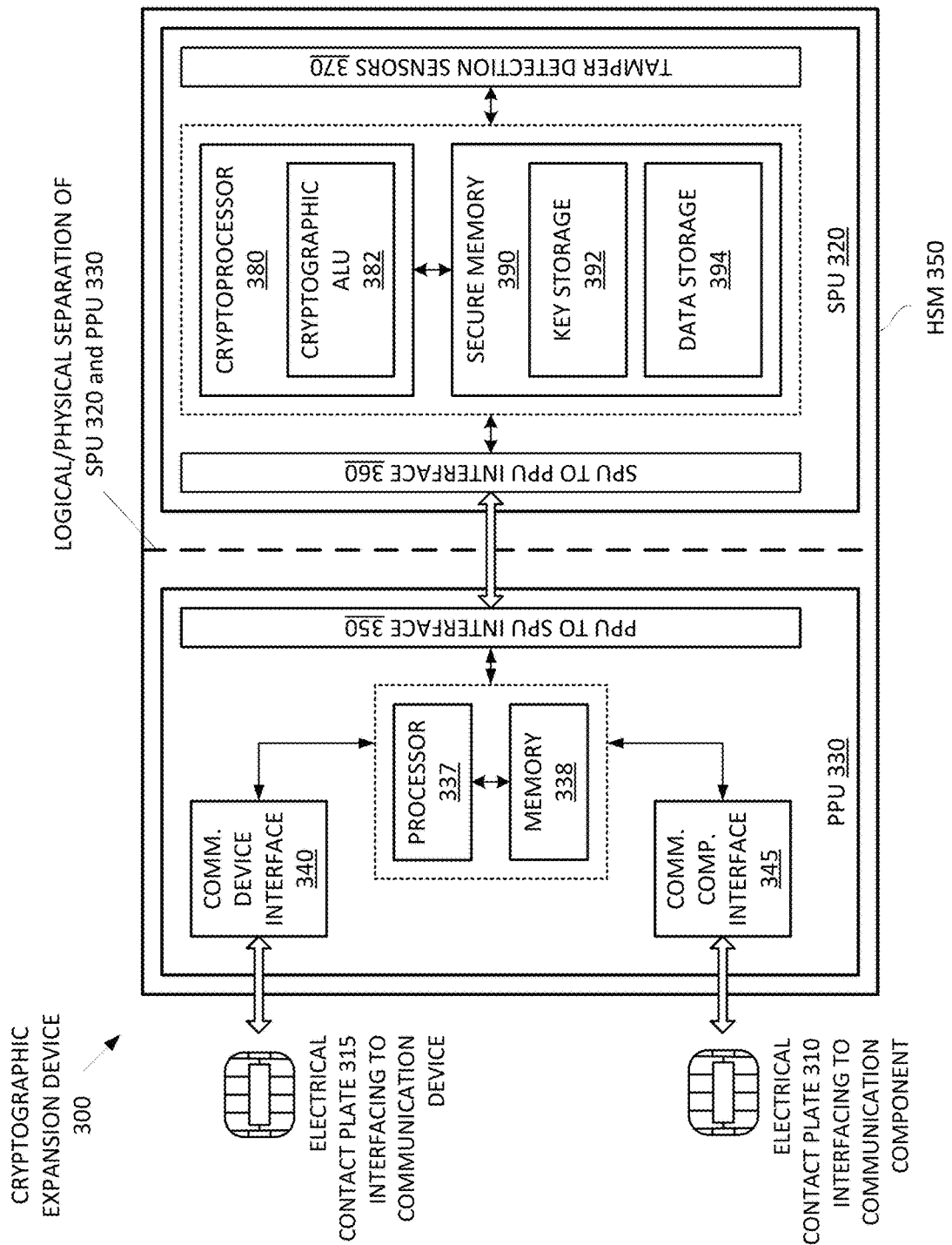

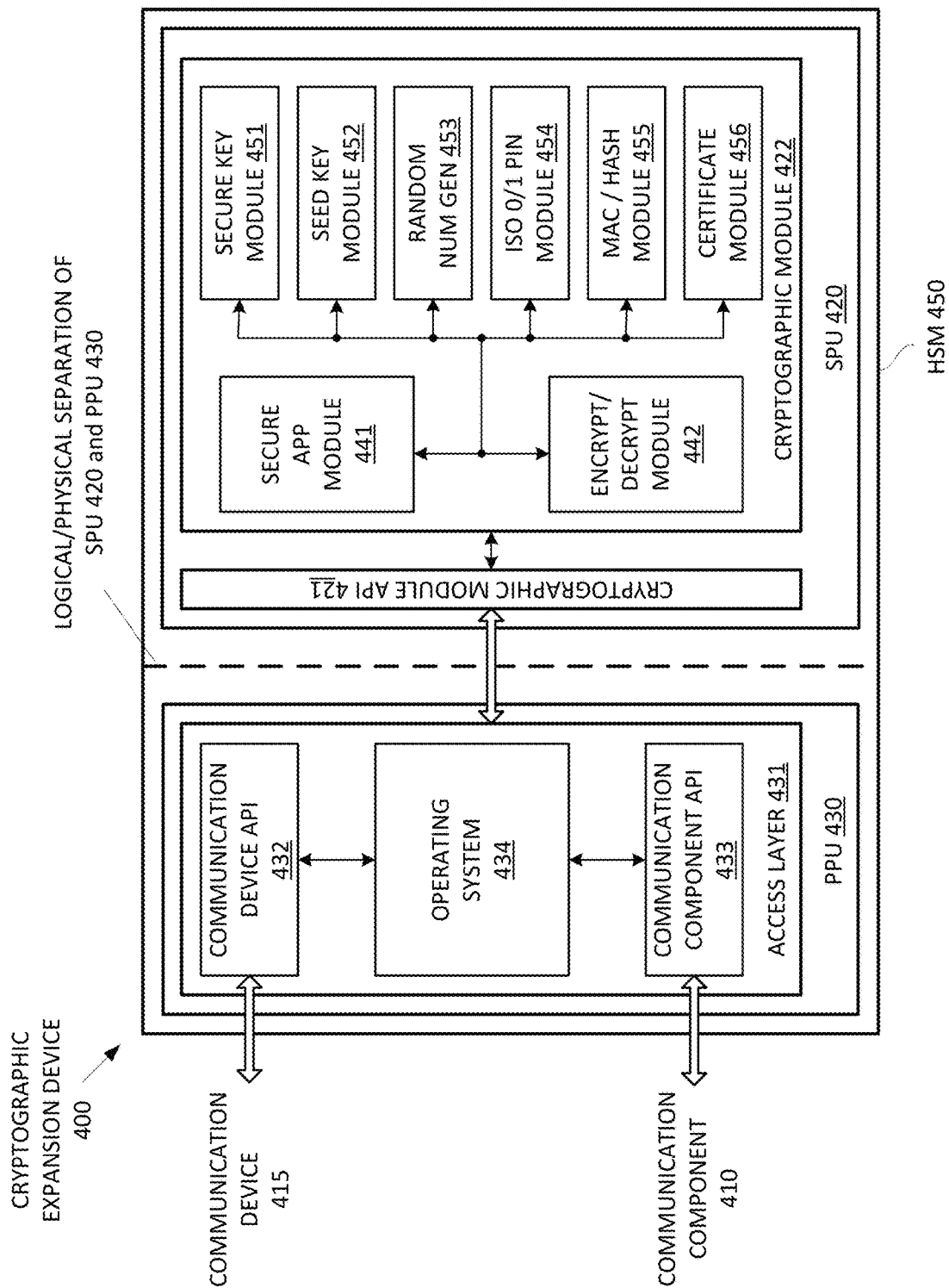

SMALL FORM-FACTOR CRYPTOGRAPHIC EXPANSION DEVICE

CROSS-REFERENCES TO RELATED APPLICATIONS

This application is a continuation of U.S. patent application Ser. No. 13/875,985, entitled "SMALL FORM-FACTOR CRYPTOGRAPHIC EXPANSION DEVICE," filed May 2, 2013, which claims priority from U.S. Provisional Patent Application No. 61/641,686, entitled "CHIP ARCHITECTURE FOR COMMUNICATION CARD," filed May 2, 2012, the contents of which are hereby incorporated by reference in their entirety for all purposes.

BACKGROUND

In developing countries and rural areas, less than 10% of the population may have access to banking services from traditional brick-and-mortar banks. In such areas, a bank may be physically located too far away for a majority of the population to travel to. And even if a bank is nearby, it may be the only bank location in the vicinity of a vast region covering a large number of the population. The brick-and-mortar bank may not have the resources and capacity to adequately support such a large number of customers, resulting in long wait times and inconvenience for the bank's customers. In most developing countries, building additional bank branches and/or installing automated teller machines (ATMs) at various locations are often not a viable solution due to the high costs of the complex infrastructure involved. Even in developed countries where there are more bank branches and ATM locations available, customers may still have limited access to banking services such as services that are not available from ATMs during non-business hours. Furthermore, certain customers such as the elderly or customers with disabilities may still have difficulty getting to the bank branches or ATM locations.

In recent years, the use of mobile devices in developed and developing countries has grown rapidly. As such, one way of providing these communities with access to banking services is to enable users of mobile devices to perform mobile banking transactions, such as making mobile payments or money transfers, or checking account balances or performing other account related services, directly from their mobile devices. However, security concerns are often a stumbling block that hinders the wide adoption and growth of mobile banking. Most mobile devices lack the capability to securely send end-to-end encrypted communication. As a result, sensitive information, such as a Personal Identification Numbers (PINs) and Primary Account Numbers (PANs), might be sent in plaintext form, creating a vulnerability in which such sensitive information can be intercepted by malicious parties and be used for fraudulent purposes.

While some security measures can be provided by mobile network operators, for example, to provide encryption capabilities at a base station, the protection provided by such solutions is still limited because the communication is still sent in plaintext form at some point during the transmission. Other solutions require re-provisioning of users' mobile devices, for example, by over the air (OTA) provisioning, and such solutions can be costly in terms of both deployment and operating costs. Consequently, mobile operators have to either pass this cost onto their customers or absorb it themselves. Thus, the total cost of ownership (TCO) is also often a stumbling block that prevents the uptake and growth of mobile banking. Without a cost-effective and efficient way to securely send and receive communication with mobile devices, mobile banking operators are destined to incur losses or fail to roll out their mobile banking services entirely.

Embodiments of the present invention address these and other problems individually and collectively.

BRIEF SUMMARY

Embodiments of the present invention disclose a cryptographic expansion device that can be attached to a communication component of a communication device to enable the communication device to perform cryptographic operations on communications sent to and from the communication device. In some embodiments, the cryptographic expansion device is a small-form factor cryptographic expansion device that can be used with a small-form factor communication component such as a micro-SIM (subscriber identity module) card. When used with a communication device such as a mobile phone, the cryptographic expansion device enables the communication device to send and received end-to-end secure encrypted communications. The cryptographic expansion device according to various embodiments can be used with a communication device without requiring any changes to the internal software or hardware of the communication device and without requiring any modification to the communication protocols used by the communication device. In some embodiments, the end-to-end secure communications enabled by the cryptographic expansion device can be utilized by a user of the communication device to perform financial and/or banking transactions.

According to some embodiments, the small-form factor cryptographic expansion device is in the form of a label that includes a top electrical contact plate for interfacing to a communication device, a bottom electrical contact plate for interfacing to a communication component, and a substrate disposed between the top electrical contact plate and the bottom electrical contact plate. The small-form factor cryptographic expansion device also includes a hardware security module embedded within the substrate and between the top and bottom electrical contact plates. The hardware security module is coupled to the top and bottom electrical contact plates, and includes a secure processing unit and a public processing unit. In some embodiments, the small-form factor cryptographic expansion device includes an adhesive material disposed on the bottom of the small-form factor cryptographic expansion device to attach the small-form factor cryptographic expansion device to a communication component, such as a SIM card.

According to some embodiments, a communication system for sending secure communications includes a communication component and a cryptographic label that is attached to the communication component. The cryptographic label enables a communication device using the communication component to send encrypted data using a cryptoprocessor embedded in the cryptographic label. The cryptographic label includes a top electrical contact plate, a bottom electrical contact plate electrically coupled to the communication component, a cryptoprocessor embedded in the cryptographic label between the top and bottom electrical contact plates, and a processor coupled to the cryptoprocessor and embedded in the cryptographic label between the top and bottom electrical contact plates.

According to some embodiments, a method for enabling the transmission of secure communications from a communication device involves the use of a cryptographic label having two electrical contact plates and a cryptographic processor embedded in the cryptographic label. The cryptographic label is attached to a communication component of the communication device via one of the electrical contact plates. The method includes receiving a message at the cryptographic label, and determining if the message is associated with a secure operation. The messages is determined to be associated with a secure operation, for example, if the messages is being used in a financial or payment transaction, or if the message includes sensitive data or information such as account numbers and PINs. A secure operation can involve one or more of encryption, decryption, message authentication code generation or verification, hash generation or verification, or other functions to be performed by the cryptographic label.

If it is determined that the message is associate with a secure operation, the cryptographic processor embedded in the label between the two electrical contact plates performs a cryptographic operation on the data or information associated with the secure operation. The data or information processed by the cryptographic processor is sent from the cryptographic label to the communication device via one of the electrical contact plates for transmission in a secure communication. If the message is determined to be associated with a non-secure operation, the message is passed through between the communication component and the communication device without being processed by the cryptographic processor. In an exemplary embodiment, the communication device can be a mobile phone, the communication component can be a SIM card, and the secure communication can be sent as an encrypted Short Message Service (SMS) message, an Unstructured Supplementary Service Data (USSD) message, a Near Filed Communication (NFC) communication, or a Radio Frequency (RF) communication.

These and other embodiments of the invention are described in further details below.

BRIEF DESCRIPTION OF THE DRAWINGS

FIG. 3 illustrates a block diagram of the components of a cryptographic expansion device, according to one embodiment of the present invention.

FIG. 4 illustrates a conceptual block diagram of the functional blocks of a cryptographic expansion device, according to one embodiment of the present invention.

DETAILED DESCRIPTION

Figure 1A:
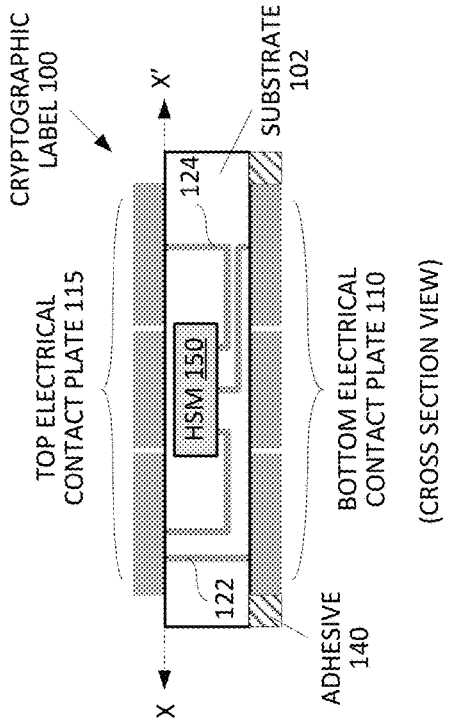
FIG. 1A illustrates a perspective view of a cryptographic expansion device and a communication component of a communication device, according to one embodiment of the present invention.

Embodiments of the present invention disclose a cryptographic expansion device that can be attached to a communication component of a communication device to enable the communication device to perform cryptographic operations on communications sent to and from the communication device. The cryptographic expansion device includes embedded processors and storage capabilities that can be used to implement a Federal Information Processing Standards (FIPS) compliant hardware security module (HSM) to provide the communication device with the set of security features and functions as found in industry-standard HSMs. When used with a communication device, the cryptographic expansion device enables the communication device to send and received end-to-end secure communications, and enables mobile operators to utilize their otherwise unsecure communication channels to send and receive encrypted communications. Furthermore, the cryptographic expansion device according to various embodiments can be used with a communication device without requiring any changes to the internal software or hardware of the communication device and without requiring any modification to the communication protocols of the communication device. Thus, the cryptographic expansion device according to embodiments of the invention can be widely deployed in a cost-effective and efficient way. In some embodiments, the end-to-end secure communications enabled by the cryptographic expansion device can be utilized by a user of the communication device to perform financial and/or banking transactions.

Examples of the security features that the cryptographic expansion device can provide include running a secure operating system and secure key management related functions such as cryptographic key generation, configuration of security limits and capabilities of the cryptographic keys, cryptographic keys backup and recovery, secure cryptographic keys storage, and revocation and destruction of cryptographic keys. The cryptographic expansion device can encrypt and decrypt data using various encryption standards and protocols including but not limited to Advance Encryption Standard (AES), Data Encryption Standard (DES), Triple Data Encryption Standard/Algorithm (TDES/TDEA), Secure Socket Layer (SSL), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols. The cryptographic expansion device can also generate and verify message authentication codes (MAC) and cryptographic hashes on communications sent to and from a communication device.

It should be appreciated that the cryptographic expansion device according to embodiments of the invention uses dedicated cryptographic hardware components provided in the cryptographic expansion device to perform cryptographic operations. This is different from software encryption technologies that use software with a general purpose processor to perform encryption, and provides enhanced security protection over such software encryption technologies. In some embodiments, the cryptographic expansion device is implemented as a dual processing-unit device that includes a FIPS compliant secure processing unit and a public processing unit. This division in hardware roles introduces an additional level of security by providing a physical and logical separation between interfaces that are used to communicate critical security parameters and other interfaces that are used to communicate other data. Furthermore, the cryptographic expansion device can also provide a tamper-resistant mechanism that provides a high risk of destroying components in the cryptographic expansion device and the cryptographic keys stored therein, if any attempt is made to remove or externally access the cryptographic expansion device.

According to some embodiments, the cryptographic expansion device is a label that is attachable to a communication component such as a subscriber identity module (SIM) card of a mobile device such as a mobile phone. In implementations in which the SIM card is a full-size SIM or a mini-SIM, the circuitry of the cryptographic expansion device implementing the HSM or the processing units are positioned on the label in an area that is located away from and outside the footprint of the electrical contact regions of the label that interfaces with the SIM card. While this may be a viable option for form-factors that have considerable unused area outside the electrical contact region, for smaller form-factors such as that of a micro-SIM, the area outside of the electrical contact region may be too small to accommodate the circuitry of the cryptographic expansion device. Accordingly, embodiments of the invention provide a way to outfit a small form-factor communication component, such as a micro-SIM card, with a cryptographic expansion device by sandwiching the circuitry of the cryptographic expansion device implementing the HSM or the processing units between two electrical contact plates that form the electrical contact region of the cryptographic expansion device.

As used herein, the term "secure communication" refers to a communication that includes at least some portion of the communication that is sent or received in an encrypted format. The term "secure operation" refers to a process or a function that involves performing one or more cryptographic operation. Examples of a "secure operation" can include sending or receiving of a secure or encrypted communication, or performing a financial or banking transaction with encrypted data. The term "cryptographic operation" refers to any of encryption, decryption, MAC generation or verification, hash generation or verification, and/or any of the functions provided by the cryptographic expansion device as described herein. The term "non-secure communication" refers to a communication that is sent or received in plaintext form. The term "non-secure operation" refers to a process or a function that does not involve performing a secure operation.

According to various embodiments, the cryptographic expansion device can be attached to a communication component of a communication device to enable the communication device to send and receive secure communications. A communication device is a device that is capable of sending and receiving communications with a recipient device. The communication device can be a mobile device such as a mobile phone or other types of portable communication device (e.g., a personal digital assistant, portable computing devices such as tablet computers or laptops, or portable multi-functional devices that can send and receive communications such as portable media players/readers, portable gaming devices, etc.). The recipient device that the communication device communicates with can be another communication device, a payment device such as point-of-sale (POS) device or an automated teller machine (ATM), networking equipment, and/or telecommunication equipment of a mobile network operator. In some embodiments of the present invention, the communication device may lack the capability to perform cryptographic operations to encrypt and decrypt communications sent to and from the communication device. A cryptographic expansion device can be attached to a communication component of the communication device to provide the communication device with the capability to perform cryptographic operations. In other embodiments, the communication device may be capable of performing some cryptographic operations, for example, to encrypt or decrypt data using encryption software. In such embodiments, a cryptographic expansion device can still be used with the communication device to expand and/or enhance the cryptographic capabilities of the communication device, for example, to provide encryption algorithms that may otherwise be unavailable in the encryption software of the communication device.

According to some embodiments, the communication component that the cryptographic expansion device attaches to is a user-removable communication component of a communication device. For example, the communication component can be a subscriber identity module (SIM) card or other types of communication card that is used in conjunction with the communication device to send and receive communications. The communication component can also be other types of user-removable component of a communication device such as various types of memory card, for example, a secure digital (SD) memory card that can be used in conjunction with the communication device to send and receive communications.

The communication component of a communication device can come in various form factors. For example, in embodiments in which the communication component is a SIM card, the communication component can have a form factor according to a full-sized SIM card or a mini-SIM card as specified in the ISO/IEC 7810 standard, or a micro-SIM card or a nano-SIM card as specified in the ETSI TS 102 221 standard. In other embodiments, for example, in which the communication component is a SD memory card, the communication component can have a form factor according to a full-size SD card, a micro-SD card, or a mini-SD card as specified in the SD standard of the Secure Digital Association.

Physical Characteristics of Cryptographic Expansion Device

Figure 1B:
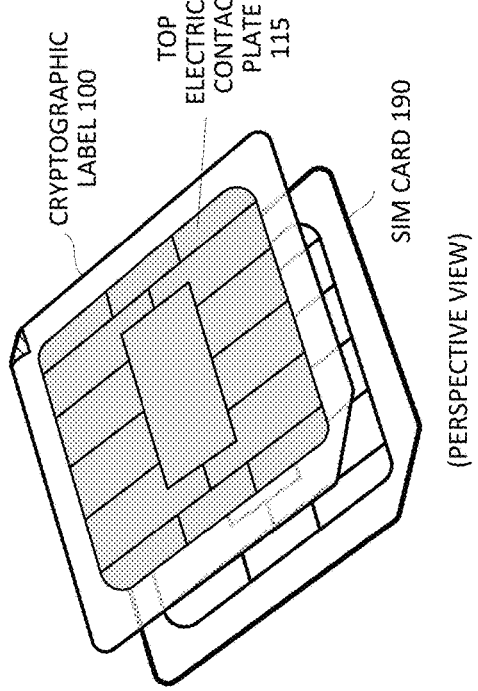
FIG. 1B illustrates a top view of a cryptographic expansion device, according to one embodiment of the present invention.
Figure 1D:
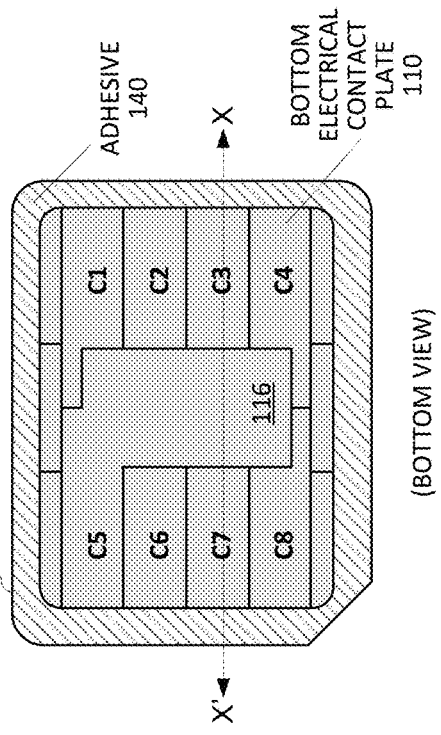
FIG. 1D illustrates a cross section view of a cryptographic expansion device, according to one embodiment of the present invention.
Figure 1C:
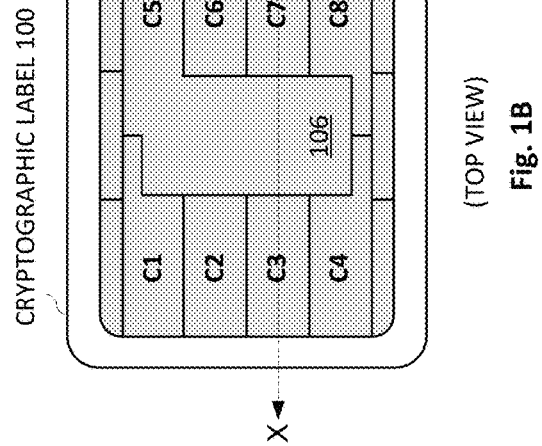
FIG. 1C illustrates a bottom view of a cryptographic expansion device, according to one embodiment of the present invention.

According to various embodiments, the cryptographic expansion device includes one or more integrated circuits implementing a hardware security module (HSM) disposed therein. FIGS. 1A-D illustrate a cryptographic expansion device according to one embodiment of the invention. According to the embodiment as shown, the cryptographic expansion device is a cryptographic label 100, and the communication component that the cryptographic label 100 attaches to is a SIM card 190, such as a micro-SIM card as shown. FIG. 1A illustrates a perspective view of cryptographic label 100 over SIM card 190. FIGS. 1B-C illustrate the planar views of the top and bottom of cryptographic label 100, respectively. FIG. 1D illustrates a cross section view of cryptographic label 100. It should be noted that the figures are illustrative and may not necessarily be drawn to scale.

It should be understood that while the description and explanation provided herein may be made with reference to a particular embodiment, the description and explanation provided below are applicable to and can be adapted for other embodiments, for example, embodiments in which the cryptographic expansion device is used with a SIM card with a different form factor, or in which the cryptographic expansion device is used with other types of communication component such as a memory card.

Cryptographic label 100 includes a top electrical contact plate 115 for interfacing to a communication device disposed on the top side of cryptographic label 100, a bottom electrical contact plate 110 for interfacing with a communication component disposed on the bottom side of cryptographic label 100, and a substrate 102 disposed between the top electrical contact plate 115 and the bottom electrical contact plate 110. Cryptographic label 100 also includes a HSM 150 embedded within substrate 102 and between the top and bottom contact plates 115 and 110. HSM 150 is electrically coupled to the top and bottom contact plates 115 and 110, and includes a public processing unit (PPU) which can be implemented with one or more processors or controllers, and a secure processing unit (SPU) which can be implemented with one or more cryptoprocessors. In some embodiments, HSM 150 is a packaged semiconductor chip that includes both SPU and PPU in a single package, but with a logical and physical separation between SPU and PPU. In other embodiments, SPU and PPU can be individually packaged semiconductor chips or semiconductor dies that are coupled together in cryptographic label 100 to implement HSM 150.

Cryptographic label 100 can also include a coupling element that can be used to attach cryptographic label 100 to a communication component such as SIM card 190. In some embodiments, the coupling element is an adhesive material 140 (e.g., shown in FIGS. 1C and 1D) disposed on the bottom side of cryptographic label 100. Thus, cryptographic label 100 can be applied to the surface of SIM card 190 similar to an adhesive label or a sticker. In other embodiments, the coupling element can be a mechanical mechanism such as notches provided on cryptographic label 100 or a clip that can be used to physically secure cryptographic label 100 to SIM card 190. In some embodiments, cryptographic label 100 can have a substrate 102 that is flexible or semi-flexible, for example, to facilitate the application of cryptographic label 100 to the surface of SIM card 190. Substrate 102 of cryptographic label 100 can also be rigid or semi-rigid, for example, to provide stiffness to protect the cryptographic label 100.

According to various embodiments, cryptographic label 100 can have various different form factors. In some embodiments, cryptographic label 100 can have a form factor with planar dimensions (e.g., length and/or width) that are substantially the same as the planar dimensions of a micro-SIM card as shown in the figures. One or more planar dimensions of cryptographic label 100 can be within 1%, 2%, 5%, 10%, 15%, or 20% of the corresponding planar dimension of a micro-SIM card. For example, in a particular embodiment in which the length of a micro-SIM card is 15 millimeters (mm) and the length of cryptographic label 100 is within 10% of the length of the SIM card, the length of cryptographic label 100 can be between 13.5 mm (90% of 15 mm) and 16.5 mm (110% of 15 mm).

In other embodiments, cryptographic label 100 can have a form factor with one or more planar dimensions that is different than the corresponding planar dimension of the communication component with which cryptographic label 100 attaches to, if the size of cryptographic label 100 does not prevent the communication component from being used with a communication device. In other words, referring to the embodiment shown in FIG. 1A, the planar dimensions of cryptographic label 100 should allow SIM card 190 attached with cryptographic label 100 to fit into a SIM card receiving slot of a communication device. It should be noted that this does not mean that the planar dimensions of cryptographic label 100 has to be smaller than SIM card 190. For example, in some embodiments, cryptographic label 100 can be longer than SIM card 190 and can extend out of a SIM card receiving slot of a communication device if the communication device can tolerate such a configuration. In other embodiments in which the substrate of cryptographic label 100 is a flexible substrate, when cryptographic label 100 is applied to SIM card 190, the excess portions of cryptographic label 100 that extends over the surface of SIM card 190 can be folded over to wrap around SIM card 190.

Furthermore, in some embodiments, a cryptographic label with a form factor corresponding to one type of SIM card can be used with a SIM card that has a different form factor. For example, although cryptographic label 100 as shown in FIGS. 1A-D has a form factor with planar dimensions that are substantially the same as a micro-SIM card, cryptographic label 100 can be attached to a full-size SIM card or a mini-SIM card instead of a micro-SIM card.

FIG. 1B illustrates a planar view of the top side of cryptographic label 100 according to one embodiment. Electrical contact plate 115 disposed on the top side of cryptographic label 100 is used for interfacing cryptographic label 100 to a communications device; that is, to electrically couple cryptographic label 100 to a SIM card reader of a communications device when a SIM card attached with cryptographic label 100 is inserted into a SIM card receiving slot of the communication device. Thus, electrical contact plate 115 is positioned on the top side of cryptographic label 100 to align with the electrical contacts of a SIM card reader of the communication device. In some embodiments, electrical contact plate 115 is an ID-000 contact plate that is compliant with the ISO/IEC 7810 standard, and can be made of copper or other metallic or electrically conductive materials.

According to some embodiments, electrical contact plate 115 is etched, cut, or otherwise has grooves formed thereon to define individual electrical contacts and to electrically isolate the defined electrical contacts from one another. In some embodiments, electrical contact plate 115 may have eight electrical contacts C1-C8 defined and formed thereon in accordance with ISO/IEC 7810 as shown in FIG. 1B. The eight electrical contacts are arranged with four electrical contacts C1-C4 in one column along one edge of electrical contact plate 115, and with four electrical contacts C5-C8 in another column along an opposing edge of electrical contact plate 115. In some embodiments, the C5 electrical contact is an electrical ground and can be electrically connected with the central region 106 of electrical contact plate 115, which is the area between the two columns of electrical contacts. In some embodiments, the C5 electrical contact may be electrically isolated from central region 106, or the etch pattern of electrical contact plate 115 may lack a central region 106. In other embodiments, electrical contact plate 115 may only have six electrical contacts with C1-C3 in one column and C5-C7 in the opposing column because electrical contacts C4 and C8 may be unused. In further embodiments, any number of electrical contracts can be used to correspond to the number of electrical contacts on the communication component with which cryptographic label 100 interfaces to.

It should also be understood that the etch pattern as shown in the figures is for illustrative purpose only, and different embodiments may use different etch patterns to define the electrical contacts in accordance with ISO/IEC 7810.

FIG. 1C illustrates a planar view of the bottom side of cryptographic label 100 according to one embodiment. Electrical contact plate 110 disposed on the bottom side of cryptographic label 100 is used for interfacing cryptographic label 100 to a communications component, for example, to electrically couple cryptographic label 100 to a communication card such as SIM card 190. Thus, electrical contact plate 110 is positioned on the bottom side of cryptographic label 100 to align with the electrical contacts of the communications component (e.g., SIM card 190) that cryptographic label 100 attaches to. According to some embodiments, electrical contact plate 110 is an ID-000 contact plate that is compliant with the ISO/IEC 7810 standard, and can be made of copper or other metallic or electrically conductive materials.

Similar to electrical contact plate 115, electrical contact plate 110 can be etched, cut, or otherwise has grooves formed thereon to define individual electrical contacts and to electrically separate each electrical contact from one another. In some embodiments, the etch pattern of electrical contact plate 110 may be similar to that of electrical contact plate 115, and is a mirror image of electrical contact plate 110 when viewed from the bottom as shown in FIG. 1C. The number of electrical contacts defined on electrical contact plate 110 may correspond to the number of electrical contacts on electrical contact plate 115 (e.g., electrical contact plates 110 and 115 may each have eight electrical contacts defined, or may each have six electrical contacts defined in accordance with ISO/IEC 7810). In other embodiments, the number of electrical contacts formed on electrical contact plate 110 may be different than electrical contact plate 115 (e.g., one electrical contact plate may have eight electrical contacts, and the other electrical contact plate may have six electrical contacts, etc.).

According to some embodiments, an adhesive material 140 is disposed on the bottom side of cryptographic label 100 around at least a portion of the perimeter of electrical contact plate 110. The planar area of substrate 102 is sized larger than electrical contact plate 110, and in some embodiments, is substantially the same size as the planar area of a micro-SIM card. The planar area of substrate 102 that extends beyond the footprint of electrical contact plate 110 allows an adhesive skirt of adhesive material 140 to be disposed on the bottom of substrate 102. In some embodiments, the adhesive skirt corresponds to the plastic region of a micro-SIM card surrounding the electrical contact region of the micro-SIM card. When cryptographic label 100 is applied to a micro-SIM card, the adhesive skirt attaches to the plastic region of the micro-SIM card and cryptographic label 100 in place to physically and electrically couple the cryptographic label 100 to the micro-SIM card.

In some embodiments, adhesive material 140 may be disposed along the outside of all four edges of electrical contact plate 110 such that adhesive material 140 surrounds electrical contact plate 110 as shown in FIG. 1C. In other embodiments, adhesive material 140 may be disposed along the outside of just one or two or three edges of electrical contact plate 110. In some embodiments, adhesive material 140 may extend from the edges of electrical contact plate 110 all the way to the edges of the bottom surface of substrate 102 or cryptographic label 100 as shown. In other embodiments, adhesive material 140 may cover just a portion of the area between the edges or perimeter of electrical contact plate 110 and the edges or perimeter of the bottom surface of substrate 102 or cryptographic label 100.

In addition to securing cryptographic label 100 to SIM card 190, in some embodiments, the adhesive material 140 can also serve as a tamper-resistant mechanism to provide a high risk of destroying cryptographic label 100 if an attempt is made to remove cryptographic label 100 from SIM card 190 after cryptographic label 100 has been attached to SIM card 190. For example, after cryptographic label 100 has been applied to the surface of SIM card 190, if an attempt is made to remove cryptographic label 100 from SIM card 190 by peeling off cryptographic label 100, the adhesive material 140 may rip apart the electrical contacts of cryptographic label 100, and/or the interconnects and circuits electrically coupling the components of cryptographic label 100 to render cryptographic label 100 unusable. Alternatively or in addition, the adhesive material 140 may rip apart portions of SIM card 190 to render SIM card 190 unusable as well if an attempt is made to remove cryptographic label 100 from SIM card 190.

FIG. 1D illustrates a cross section view of cryptographic label 100 along the line X-X' as illustrated in the planar views of FIGS. 1B-C according to one embodiment. Cryptographic label 100 includes a substrate 102 disposed between the top and bottom electrical contact plates 115 and 110. Substrate 102 can be made of a plastic material such as polyimide or other suitable materials. According to some embodiments, the circuitry of HSM 150 is completely embedded within substrate 102 of cryptographic label 100 as shown. In other words, the circuitry of HSM 150 does not protrude out of cryptographic label 100, and in some embodiments, may not be visible from the top or bottom of cryptographic label 100. HSM 150 is electrically coupled to the top and bottom electrical contact plates 115 and 110, and is embedded in substrate 102 at a positioned in between the top and bottom electrical contact plates 115 and 110. In some embodiments, the footprint of the circuitry of HSM 150 fits entirely within the footprints of the top and bottom electrical contact plates 115 and 110. In other embodiments, the footprint of the circuitry of HSM 150 may extend beyond the footprint of either electrical contact plate.

The thickness of cryptographic label 100 is made to be thin enough such that when cryptographic label 100 is attached to SIM card 190, SIM card 190 can still be inserted or removed by a user from a SIM card receiving slot of a communication device such as a mobile phone without the use of complicated tools. In one embodiment, substrate 102 has a thickness of 50 microns (um), the bottom electrical contact plate 110 has a thickness of 30 um, and the top electrical contact plate 115 has a thickness of 50 um to yield a total thickness of 130 um for cryptographic label 100. In other embodiments, the total thickness of cryptographic label 100 maybe less than 200 um, and in some embodiments, less than 150 um. By keeping the thickness of cryptographic label 100 to be less than 200 um, cryptographic label 100 can be applied to a SIM card and still allows the SIM card to be inserted into a SIM card receiving slot of a communication device.

As mentioned above, HSM 150 can be a single packaged semiconductor chip or die. Alternatively, SPU and PPU of HSM 150 can be individually packaged semiconductor chips or semiconductor dies that are coupled together in substrate 102 to implement the circuitry of HSM 150. Interconnects and circuits electrically coupling the various components (i.e. electrical contact plates 110 and 155, HSM 150, and/or SPU and PPU) of cryptographic label 100 can be formed by etching the circuits into substrate 102 of cryptographic label 100, screen-printing the circuits in substrate 102, or by providing the components of cryptographic label 100 with solderble contacts that when heated, would bind to circuitry in substrate 102 to form the interconnects and circuits.

In the embodiment as shown in FIG. 1D, the planar area of the circuitry of HSM 150 (which includes SPU and PPU) is substantially the same size or smaller than the planar area of the central region 106 or 116 of the top or bottom electrical contact plate 115 or 110. This allows the interconnects 122 and 124 to be routed from top electrical contact plate 115 to the bottom of HSM 150 around the sides of HSM 150 instead of having interconnect routing in the region between top electrical contact plate 115 and the top of HSM 150. This may allow substrate 102 to be made as thin as possible, because the substrate does not need to accommodate any interconnect routing on the top of HSM 150.

It should be noted that some signals such as a clock signal corresponding to the C3 electrical contact in accordance with ISO/IEC 7810 can be directly connected between top electrical contact plate 115 and bottom electrical contact plate 110 as shown with interconnect 122, if the signal can be passed through from the communication component (e.g., SIM card 190) to the communication device (e.g., mobile phone) without security consequences. For other signals such as the data I/O signal (e.g., interconnect 124) corresponding to the C7 electrical contact in accordance with ISO/IEC 7810, which is used to transmit data such as sensitive information or data of financial transactions, there is no direct connection between the top electrical contact plate 115 and bottom electrical contact plate 110, because the signal carrying the sensitive data should first be processed by HSM 150 (e.g., to encrypt the data) before being sent to the communication device for transmission to a recipient device.

It should also be noted that although FIG. 1D shows, for illustrative purpose, the routing of data I/O signal from top electrical contact plate 155 to HSM 150 (i.e. interconnect 124) as being above or on top of the routing of data I/O signal from HSM 150 to bottom electrical contact plate 110, the two interconnects can be routed on the same interconnect layer, and only one interconnect layer is required between HSM 150 and bottom electrical contact plate 110.

Figure 2A:
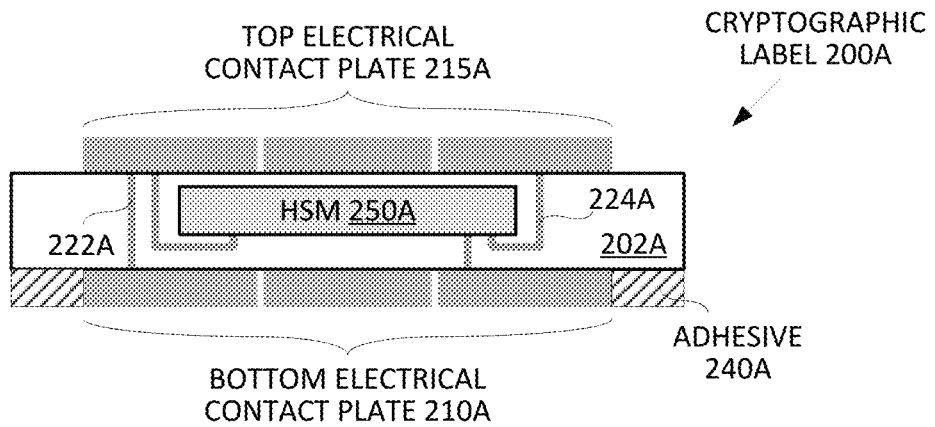
FIG. 2A illustrates a cross-sectional view of a cryptographic expansion device, according to another embodiment of the present invention.
Figure 2B:
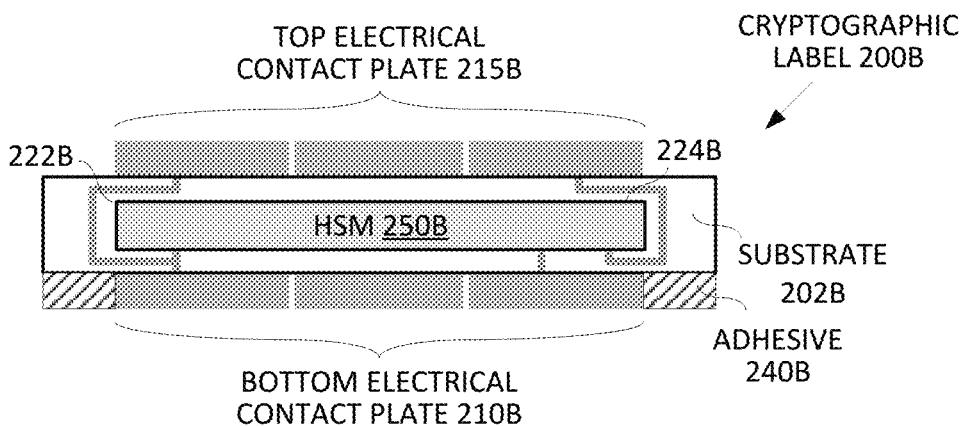
FIG. 2B illustrates a cross-sectional view of a cryptographic expansion device, according to a further embodiment of the present invention.

FIG. 2A illustrates a cross-sectional view of a cryptographic label 200A according to another embodiment. In this embodiment, the planar area of the circuitry of HSM 250A is larger than the planar area of the central region of the top or bottom electrical contact plates 215A or 210A, but does not extend beyond the footprint of the top and bottom electrical contact plates 215A and 210A. The circuitry of HSM 250A according to such embodiments may require a larger area, for example, to have a larger storage or memory capacity implemented in the HSM. In these embodiments, the interconnect routing area available along the sides of HSM 250A in the substrate 202A is reduced. Nevertheless, there is still sufficient routing area in that region to enable the substrate 202A to be made as thin as possible FIG. 2B illustrates a cross-sectional view of a cryptographic label 200B according to a different embodiment. In this embodiment, the planar area of the circuitry of HSM 250B extends to the footprint of the top or bottom electrical contact plates 115 or 110. In this embodiment, the size of the HSM 250B leaves little room for interconnect routing in substrate 202B around the sides of the HSM 250B under the footprint of top electrical contact plate 215B. Thus, some interconnects are routed between the top electrical contact plate 215B and the top of HSM 250B. In some embodiments, cryptographic label 200B and substrate 202B may be made thicker than the embodiments described above to accommodate the extra layer of interconnect routing between the top electrical contact plate 215B and the top of HSM 250B.

Figure 2C:
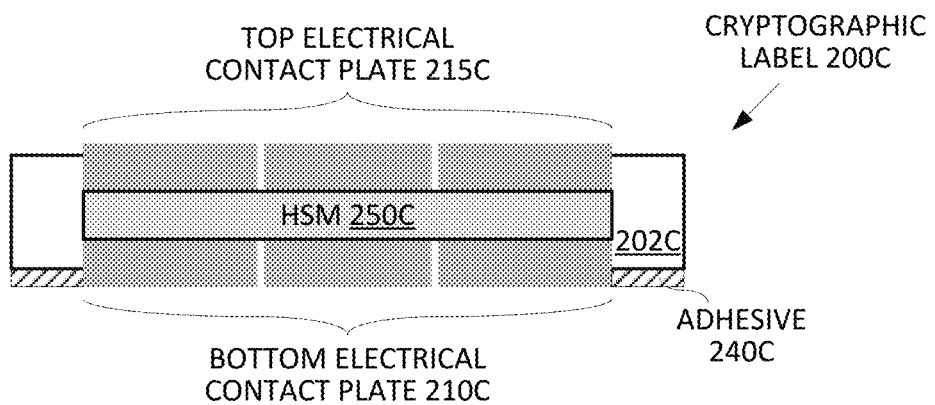
FIG. 2C illustrates a cross-sectional view of a cryptographic expansion device, according to an alternative embodiment of the present invention.

FIG. 2C illustrates a cross-sectional view of a cryptographic label 200C according to a further embodiment. Similar to the embodiment shown in FIG. 2B, the planar area of the circuitry HSM 250C extends to the footprint of the top or bottom electrical contact plates 215C or 210C. In this embodiment, because the size of HSM 250C leaves little room in substrate 202C to accommodate the interconnect routing, the top and bottom electrical contact plates 215C and 210B are formed directly on the package of HSM 250C and is partially embedded in substrate 202C. The interconnects between the top and bottom electrical contact plates 215C and 210C and the components of HSM 250C can be formed by using interconnect vias and through-hole vias formed within HSM 250C. By forming the top and bottom electrical contact plates 215C and 210C directly on the package of HSM 250C, the thickness of cryptographic label 200C may be reduce as compared to the embodiment shown in FIG. 2B, because the interconnect routing in substrate 202C between the top electrical contact plate 215C and the top of HSM 250C, and between the bottom electrical contact plate 210C and the bottom of HSM 250C can be eliminated. According to such embodiments, the planar area of the circuitry of HSM 250C can be extended to the edge of cryptographic label 200C.

It should also be understood that in embodiments in which the circuitry of HSM is of other sizes such as those described with reference to FIGS. 2A-2B, the electrical contact plates can also be formed directly on the package of HSM as shown in FIG. 2C. Furthermore, in some embodiments, there may be only one electrical contact plate 215C or 210C that is formed directly on the package of HSM 250C.

Internal Components and Features of Cryptographic Expansion Device

FIG. 3 shows a block diagram illustrating the hardware components (e.g., HSM 350) of a cryptographic expansion device 300 (e.g., any of cryptographic label 100 of FIGS. 1A-D, or cryptographic label 200A-C of FIGS. 2A-C, respectively), according to one embodiment. Cryptographic expansion device 300 includes a public processing unit (PPU) 330, and a secure processing unit (SPU) 320 coupled to PPU 330. It should be noted that although SPU 320 is coupled to PPU 330, cryptographic expansion device 300 provides a logical and/or physical separation between SPU 320 and PPU 330. A "physical separation" refers to some physical boundary between SPU 320 and PPU 330. For example, SPU 320 and PPU 330 can be implemented with and manufactured as separate semiconductor dies or separately packaged semiconductor chips, and the physical boundary of the dies or chips can serve as the physical separation. A "logical separation" refers to the separation of the communication interface and storage memory between SPU 320 and PPU 330. As shown in FIG. 3, SPU 320 has its own communication interfaces 340, 345, and 350, which is separate from communication interface 360 of SPU 320. PPU 330 also has its own memory 338, which is separate from secure memory 390 of SPU 320. As will be explained below, the logical and/or physical separation provided between SPU 320 and PPU 330 creates a division in hardware roles to protect SPU 320 and the contents stored in secure memory 390 from unauthorized accesses.

According to some embodiments, PPU 330 includes processor 337, memory 338, a communication device interface 340, a communication component interface 345, and a PPU-to-SPU interface 350. Processor 337 can be implemented as one or more processors or controllers. Memory 338 is coupled to processor 337, and provides storage to store data and executable code that when executed by processor 337, causes processor 337 to run an operating system (OS) and/or applications that can be complaint with Payment Card Industry (PCI) and International Organization for Standardization (ISO) standards to manage the functionality and operations of cryptographic expansion device 300, and to process the exchange of information between the various interfaces of PPU 330.

Communication device interface 340 is coupled to electrical contact plate 315 that interfaces with a communication device such as a mobile device (e.g., a mobile phone), and provides a set of signals that can include a clock signal and one or more data input/output (I/O) signals to send and receive commands and information between PPU 330 and the communication device. Communication component interface 345 is coupled to electrical contact plate 310 that interfaces to a communication component such as a communication card (e.g., a SIM card), and provides a set of signals that can include a clock signal and one or more data input/output (I/O) signals to send and receive commands and information between PPU 330 and the communication component. PPU-to-SPU interface 350 is coupled to SPU 320, and provides a set of signals that can include a clock signal and one or more data input/output (I/O) signals to send commands and information such as encryption and decryption requests to SPU 320, and to receive commands and information such as encryption and decryption results from SPU 320. Because of the logical and physical separation between SPU 320 and PPU 330, SPU 320 is exposed to PPU 330 only, and is not accessible to the communication device or to the communication component, except through PPU 330. Hence, PPU 330 can serve as a firewall or a gatekeeper to ensure unauthorized or unwanted communications such as hacking attempts are not sent to SPU 320.

According to some embodiments, SPU 320 includes cryptoprocessor 380, secure memory 390, and SPU-to-PPU interface 360. SPU 320 can also include tamper detection sensors 370. As mentioned above, SPU 320 is accessible from PPU 330 only, and receives commands and information from PPU 330 through SPU-to-PPU interface 360. SPU-to-PPU interface 360 provides a set of signals that can include a clock signal and one or more data input/output (I/O) signals coupled to PPU-to-SPU interface 350 that SPU 320 can use to communicate with PPU 330. In some embodiments, SPU 320 will only respond to encryption and decryption requests to perform cryptographic operations from PPU 330 received through SPU-to-PPU interface 360.

Cryptoprocessor 380 can be implemented as one or more cryptographic processors. A cryptographic processor is different from a general purpose processor in that a cryptographic processor includes dedicated circuitry and hardware such as one or more cryptographic arithmetic logic units (ALU) 382 that are optimized to perform computational intensive cryptographic functions. Cryptographic ALU 382 can include optimized pipelines and widen data buses to enable cryptoprocessor 380 to perform cryptographic operations faster and more efficiently than general purpose processors.

Secure memory 390 is coupled to cryptoprocessor 380, and can be partitioned into a cryptographic key storage 392 and a data storage 394. Data storage 394 can be read and written by cryptoprocessor 380, and provides storage memory to store user data such as data that are received on SPU-to-PPU interface 360 from PPU 330, and encryption and decryption results that are sent to PPU 330 through SPU-to-PPU interface 360. Cryptographic key storage 392 can be read-only to cryptoprocessor 380, and is used to store cryptographic keys and encryption algorithms. The cryptographic keys and algorithms stored in cryptographic key storage 392 are provisioned by the manufacturer during manufacturing of cryptographic expansion device 300, and cannot be altered by an external source without a master key that is only known to the manufacturer and/or authorized parties who are authorized to provision cryptographic expansion device 300 such as a mobile network operator or a wireless service provider. In some embodiments, the contents of cryptographic key storage 392 are never transmitted outside of SPU 320, and is inaccessible by PPU 330. The cryptographic keys and algorithms stored in cryptographic key storage 392 can be provisioned to perform various encryption standards and protocols including but not limited to Advance Encryption Standard (AES), Data Encryption Standard (DES), Triple Data Encryption Standard/Algorithm (TDES/TDEA), Secure Socket Layer (SSL), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols.

In some embodiments, SPU 320 may also include tamper detection sensors 370 to detect external attempts to tamper with cryptographic expansion device 300. For example, tamper detection sensors 370 may include temperature sensors to detect temperatures that may be indicative of someone attempting to desolder components of cryptographic expansion device 300, and/or mechanical sensors to sense structural changes to cryptographic expansion device 300 that may be indicative of someone attempting to dissect or cut open cryptographic expansion device 300. Tamper detection sensors 370 may also include electrical sensors to sense certain voltage, current, or impedance changes to the circuitry of cryptographic expansion device 300 that may be indicative of someone attempting to probe the components of cryptographic expansion device 300, and/or electromagnetic sensors to sense certain radiation such as X-rays that may be indicative of someone attempting to examine cryptographic expansion device 300. In some embodiments, tamper detection sensors 370 may include circuitry that can erase and whip out the contents of secure memory 390 to render SPU 320 and/or cryptographic expansion device 300 unusable in response to detecting an attempt to tamper with cryptographic expansion device 300. Cryptographic expansion device 300 can also be configured with organic or soluble interconnects that can be dissolved by a solvent released by tamper detection sensors 370 in response to detecting an attempt to tamper with cryptographic expansion device 300.

FIG. 4 shows a conceptual block diagram illustrating the functional features of a cryptographic expansion device 400, according to one embodiment. Cryptographic expansion device 400 can be implemented with, for example, the hardware components described with reference to the cryptographic expansion device 300 of FIG. 3. PPU 430 of cryptographic expansion device 400 includes an operating system (OS) 434, a communication device application programming interface (API) 432, and a communication component API 433. OS 434, communication device API 432, and communication component API 433 together form an access layer 431, which represents the publicly accessible portion of cryptographic expansion device 400. By "publicly accessible," it is meant that any device or components of communication device 415 (e.g., a mobile phone) that can communicate directly with communication component 410 (e.g., a SIM card), or with a communication component reader of a communication device 415 (e.g., a SIM card reader of a mobile device), would be able to send and receive commands and information to and from access layer 431.

Communication device API 432 provides a programming interface to translate commands and information received from communication device 415 into instructions and data that OS 434 can process and execute, and vice versa. For example, communication device API 432 may translate commands from communication device 415 according to a mobile phone's SIM toolkit protocol into instructions and data that OS 434 can process and execute to respond to the commands, and vice versa. Communication component API 433 provides a programming interface to translate commands and information received from communication component 410 into instructions and data that OS 434 can process and execute, and vice versa. For example, communication component API 433 may translate commands from communication component 410 according to a SIM card's SIM toolkit protocol into instructions and data that OS 434 can process and execute to respond to the commands, and vice versa.

OS 434 manages the functionality and operations of cryptographic expansion device 400, and responds to commands and information from communication device 415 (e.g., a mobile device such as a mobile phone) and/or communication component 410 (e.g., a SIM card). The functionality and operations of cryptographic expansion device 400 that OS 434 can manage includes responding to user input received on communication device 415 that relates to cryptographic operations, masking PIN entries on a user interface of communication device 415, creating ISO PIN blocks in SPU 420, sending encryption and decryption requests to SPU 420 for secure communications sent to and from a communication interface of communication device 415, sending requests to SPU 420 to create or verify MAC or hash values for messages or portions of messages sent to and from a communication interface of communication device 415, providing certificates for HTTPS applications, storing encrypted communications history, providing basic encryption to external applications, and managing commands and information exchange through the various interfaces such as passing through commands and information between communication device 415 to communication component 410.

For example, in response to encryption and decryption commands received from communication device 415 on communication device API 432, OS 434 can send encryption and decryption requests and associated data to SPU 420. OS 434 may access and process information stored in communication component 410 in response to a command to perform as such received from communication device 415 on communication device API 432. OS 434 can also access information stored in communication component 410 and forward the information to SPU 420 in response to encryption and decryption commands involving such information. OS 434 can forward encryption and decryption results from SPU 420 to communication device 415 and/or communication component 410. OS 434 can also issue commands to communication device 415 and/or communication component 410, for example, commands to request communication device 415 to send a secure communication with data encrypted by SPU 420.

For non-secure commands and information (i.e. commands and information that do not involve cryptographic operations), OS 434 can pass through or forward the non-secure commands and information between communication device 415 and communication component 410. For example, in response to non-secure commands and information from communication device 415 intended for communication component 410 received on communication device API 432, OS 434 can pass through or forward the non-secure commands and information to communication component 410 through communication component API 433. In response to non-secure commands and information from communication component 410 intended for communication device 415 received on communication component API 433, OS 434 can pass through or forward the non-secure commands and information to communication device 415 through communication device API 432.

SPU 420 of cryptographic expansion device 400 includes a cryptographic module API 421 and cryptographic module 422. Cryptographic module API 431 provides a programming interface to translate commands and information received from OS 434 into instructions and data that cryptographic module 422 can process and execute, and vice versa. For example, OS 434 may send an encryption/decryption request to SPU 420, and cryptographic module API 431 may translate the encryption/decryption request into an encryption/decryption instruction for cryptographic module 422 to execute. In some embodiments, cryptographic module API 431 may also include, in the translated encryption/decryption instruction, which particular encryption algorithm cryptographic module 422 should use based on the particular application that is requesting the cryptographic operation.

According to various embodiments, cryptographic module 422 includes a secure application module 441, an encryption/decryption module 442, a secure key module 451, a seed key module 452, a random number generator 453, an ISO 0/1 PIN module 454, a MAC/HASH module 455, and a certificate module 456. In other embodiments, cryptographic module 422 may include additional modules to perform other cryptographic operations. Secure application module 441 can store one or more secure applications such as mobile banking applications or contactless payment applications. Secure application module 441 can process user input selecting a particular function of the secure applications stored therein, and can respond with one or more commands instructing communication device 415 to perform certain operations, for example, to send an encrypted communication or send a sequence of messages to initiate communication with another device to carry out the user selected function. Secure application module 441 can also instruct encryption/decryption module 442 to perform specific cryptographic operations depending on the user selected function.

Encryption/decryption module 442 can store and execute various encryption algorithms such as Advance Encryption Standard (AES), Data Encryption Standard (DES), Triple Data Encryption Standard/Algorithm (TDES/TDEA), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other cryptographic or encryption algorithms. In response to encryption and decryption requests from PPU 430 or from secure application module 441, encryption/decryption module 442 can look up the requested encryption algorithm, obtain any necessary keys from other modules in cryptographic module 422, perform the encryption/decryption request, and respond with the encrypted/decrypted data.

Secure key module 451 stores the set of cryptographic or encryption keys that are used in the various encryption algorithms performed by encryption/decryption module 442. The encryption keys can include symmetric keys and/or asymmetric keys. Seed key module 452 stores a set of seed keys that are used to initialize the encryption/decryption module 442 in certain encryption algorithms such as AES. Seed key module 452 also stores seed keys that are used by random number generator 453 to generate random numbers used in certain encryption algorithms such as RSA and DSA. The encryption keys stored in secure key module 451 and/or the seed keys stored in seed key module 452 are provisioned during manufacturing, and cannot be altered by an external source without a master key that was used during manufacturing to program cryptographic module 422. The encryption keys and seed keys can also be provisioned to be specific to a particular cryptographic expansion device, and hence the encryption keys and seed keys can be user-specific and unique to the user of the cryptographic expansion device 400. One advantage of providing user-specific keys is that if the cryptographic keys stored in cryptographic module 422 is somehow compromised, the infiltration will be isolated to a single user, and the remaining user base of the mobile network will not be compromised. The affected user's keys can be changed without impacting the configuration of the remaining user base.

In some embodiments, cryptographic module 422 includes an ISO PIN module 454 to mask a user's PIN entry into the communication device 415 and to generate PIN blocks (e.g., ISO format 0/1 PINs) in accordance with ISO 9564 standard. The PIN blocks generated by ISO PIN module 454 stores PINs in an encrypted format that are used to verify a user's identity in banking transactions. The encrypted PINs stored in the PIN blocks of ISO PIN module 454 can be passed from SPU 420 to PPU 430 to be included in secure communications sent from communication device 415. It should be noted that the PINs stored in ISO PIN module 454 are never stored in plaintext form, but are instead stored in an encryption format. Cryptographic module 422 also include Message Authentication Code (MAC)/Hash module 455 to generate and verify MACs and/or hashes for secure communications sent to and from communication device 415. A MAC or a hash can be generated for a message or a portion of the message such that the recipient can verify the message's data integrity and authenticity. Cryptographic module 422 can also include a certificate module to provide certificates such as Transport Layer Security (TLS) and Secure Sockets Layer (SSL) certificates used to verify a user's identity in Hypertext Transfer Protocol Secure (HTTPS) applications such as web applications accessed on a web browser of communication device 415.

Functional Operations of Cryptographic Expansion Device

Figure 5:
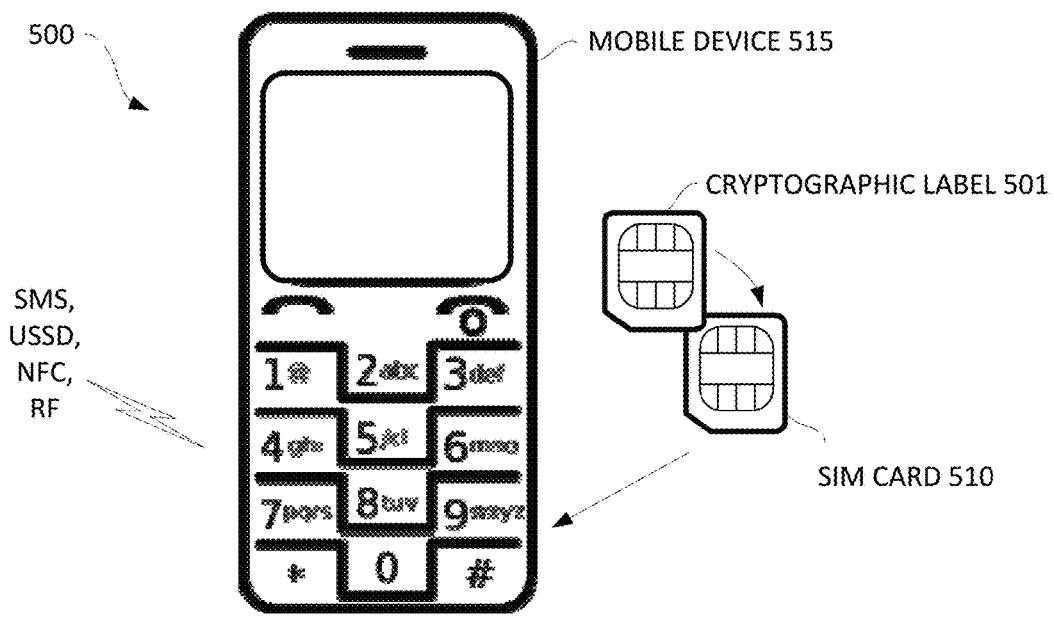
FIG. 5 illustrates a communication system for sending and receiving secure communications using a cryptographic expansion device, according to one embodiment of the present invention.

FIG. 5 illustrates a communication system 500 for sending and receiving secure communication according to an exemplary embodiment of the present invention. Communication system 500 includes a cryptographic expansion device attached to a communication component installed in a communication device. In the exemplary embodiment as shown, the cryptographic expansion device is a cryptographic label 501, the communication component is a SIM card 510, and the communication device is a mobile phone 515. For example, cryptographic label 501 can be a small form-factor cryptographic expansion device that can be attached to a micro-SIM card. It should be understood that in other embodiments, the cryptographic expansion device can be any of the embodiments described herein, communication device can be other types of communication device described above, and the communication component can be other types of user-removable communication component of a communication device such as a memory card.

In accordance with embodiments of the present invention, when mobile device 515 is equipped with cryptographic label 501, mobile device 515 can use one or more of the communication interface available in mobile device 515 to send and receive end-to-end secure communications with a recipient device. For example, cryptographic label 501 can enable mobile device 515 to send encrypted Short Message Service (SMS) or Unstructured Supplementary Service Data (USSD) messages using the cellular interface of communication device 515. In some embodiments in which mobile device 515 has a Near Filed Communication (NFC) or Radio Frequency (RF) interface, cryptographic label 501 can enable mobile device 515 to send encrypted data in NFC or RF communication using the NFC or RF interface of communication device 515. Thus, cryptographic label 501 can be used with mobile device 515 to encrypt and decrypt any type of communication that mobile device 515 is capable of sending and receiving. In some embodiments, the end-to-end secure communications enabled by the cryptographic label 501 can be utilized by a user of the communication device to access mobile banking services such as managing financial accounts and performing various financial and/or banking transactions. Examples of these mobile banking services include but are not limited to making mobile payments, making mobile money transfers, buying and selling of securities, checking account balances, and or making other financial account inquiries.

When cryptographic label 501 is attached to SIM card 510 and installed in a SIM card receiving slot of mobile device 515, cryptographic label 501 can provide and/or expand the capability of mobile device 515 to perform cryptographic operations to send and receive secure communications. It should be appreciated that in various embodiments, cryptographic label 501 provides mobile device 515 with the cryptographic capabilities without requiring any modifications to the internal hardware and/or software of mobile device 515 and without requiring any modifications to the internal hardware and/or software of SIM card 510. According to various embodiments, SIM card 510 is a standard SIM card that conforms to the ISO/IEC 7810 or ETSI TS 102 221 standards, and cryptographic label 501 can be applied to the surface of SIM card 510 without requiring any physical modifications to the SIM card itself. For example, cryptographic label 501 can be attached to a standard SIM card and be used in a mobile device without requiring the SIM card to be cut or trimmed, and without requiring any holes or openings to be formed in the SIM card.

The interactions and the exchange of commands and information between cryptographic label 501, mobile device 515, and SIM card 510 in the exemplary communication system 500 according to one embodiment will now be described in more details with reference to FIGS. 6-9. It should be understood that while the description and explanation provided below are made with reference to the particular embodiment shown in FIG. 5, the description and explanation provided below are applicable to and can be adapted for other embodiments, for example, embodiments in which the cryptographic expansion device is used with other types of communication component such as a memory card. Furthermore, the description and explanation provided below are made with reference to commands according to SIM toolkit (STK) protocol to illustrate that cryptographic label 501 can interoperate with mobile device 515 using the protocol that mobile device 515 uses to communicate with SIM card 510. In other embodiments in which the communication device communicates with a communication component using a different protocol, the description and explanation provided below can be adapted to use the commands in accordance with that protocol such that cryptographic label 501 can interoperate with the communication device seamlessly with requiring any modifications to the software of the communication device.

Figure 6:
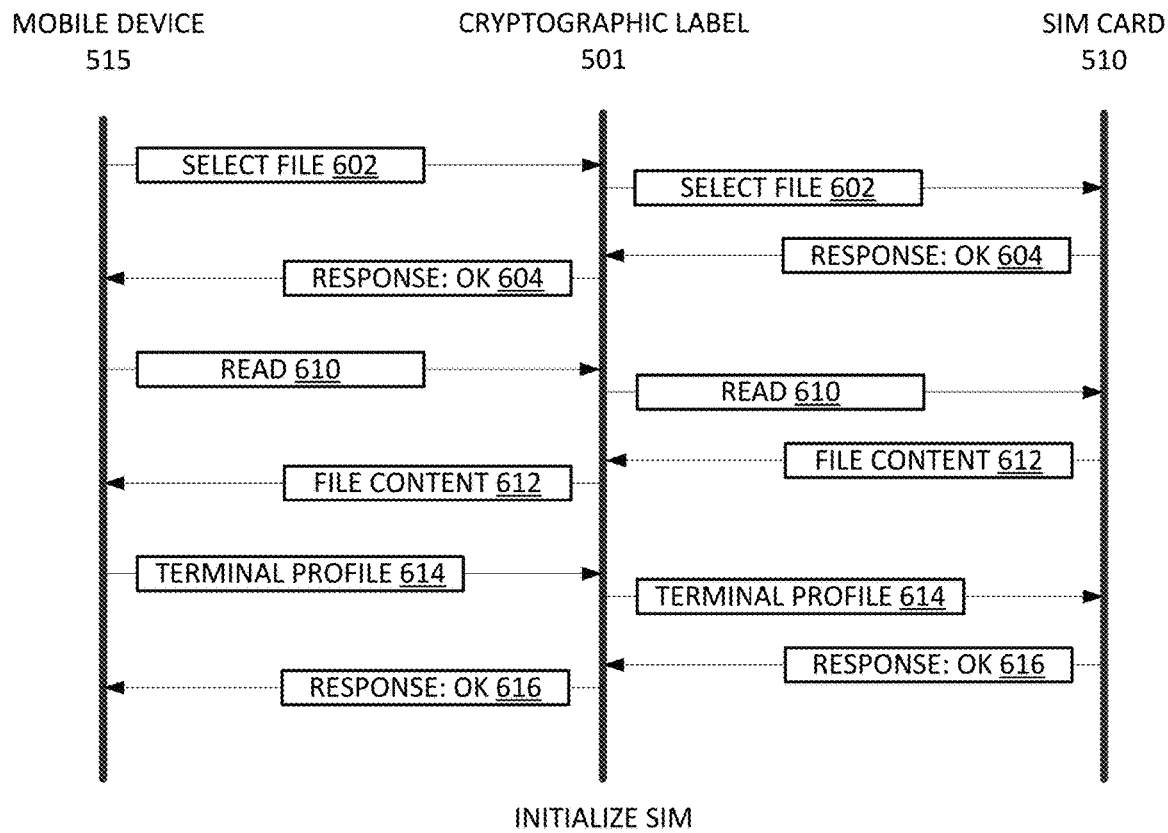
FIG. 6 illustrates a diagram showing the process of initializing a communication component in a communication device equipped with a cryptographic expansion device, according to one embodiment of the present invention.

FIG. 6 illustrates an SIM card initialization sequence according to one embodiment of the invention. When mobile device 515 powers up or is turned on, mobile device 515 issues a series of select file and read commands to the SIM card reader of the mobile device to read subscriber information from a SIM card to register the SIM card with a mobile network. Because cryptographic label 510 is attached to SIM card 510 and sits between SIM card 510 and mobile device 515, when cryptographic label 510 receives these commands from mobile device 515, cryptographic label 510 passes through or forwards these commands to SIM card 510.

For example, after power up, mobile device 515 may send a select file command 602 to select a designated file in the file system of SIM card 510 that stores subscriber information or other types of SIM card related information. Upon receiving the select file command 602, cryptographic label 501 determines that the file being requested is a file in the file system of SIM card 510, and passes through or forwards the select file command 602 to SIM card 510. SIM card 510 receives the select file command 602, accesses the requested file, and sends an response 604 towards cryptographic label 501 indicating that the requested file was accessed successfully and is ready to be read. Cryptographic label 501 then passes through or forwards response 604 to mobile device 515. In response to receiving response 604 notifying mobile device 515 that the requested file is ready to be read, mobile device 515 sends a read command 610 towards SIM card 510. Upon receiving the read command 610, cryptographic label 501 passes through or forwards the read command 610 to SIM card 510. In response to the read command 610, SIM card 510 sends file content 612 of the requested file towards mobile device 515. Depending on the file being requested, file content 612 may include subscriber information, location/region information, configuration information such as language preference, and/or other types of SIM card information. Upon receiving file content 612, cryptographic label 501 passes through or forwards file content 612 to mobile device 515. The above series of commands and exchange of information may occur multiple times to allow mobile device 515 to read any information stored in SIM card 510 that mobile device 515 may use during its SIM card initialization sequence.

After mobile device 515 finishes reading the information stored in SIM card 510, mobile device 515 may send a terminal profile 614 towards SIM card 510 to inform SIM card 510 of the properties and capabilities of mobile device 515. The terminal profile may include properties of the mobile device such as the types of communication interfaces available on the mobile device. Upon receiving terminal profile 614, cryptographic label 501 may inspect terminal profile 614 to learn the properties and capabilities of mobile device 515. Cryptographic label 501 then passes through or forwards terminal profile 614 to SIM card 510. SIM card 510 may send a response 616 towards mobile device to indicate that terminal profile 614 was successfully received. Upon receiving response 616, cryptographic label 501 passes through or forwards response 616 to mobile device 515.

Figure 7:
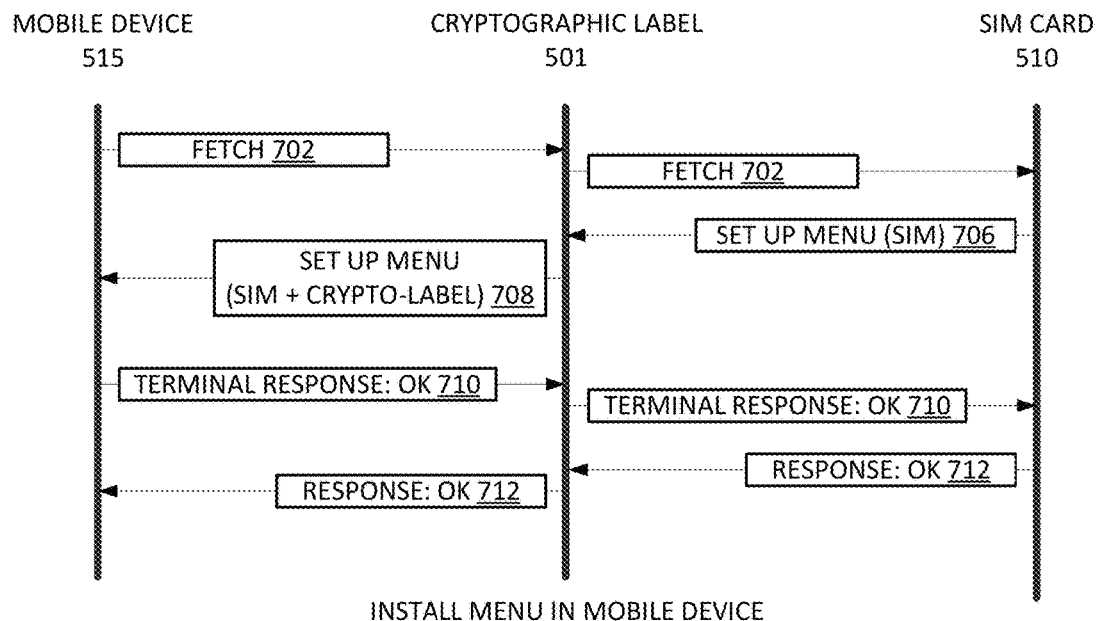
FIG. 7 illustrates a diagram showing the process of installing a user menu in a communication device equipped with a cryptographic expansion device, according to one embodiment of the present invention.

Next, the process of installing a user menu that lists the features of SIM card 510 and cryptographic label 501 onto mobile device 515 according to one embodiment of the invention will be described with reference to FIG. 7. After the SIM card initialization sequence of FIG. 6, mobile device 515 may send a fetch command 702 towards SIM card 510 to obtain any pending commands that SIM card 510 wants mobile device 515 to perform. Upon receiving fetch command 702, cryptographic label 501 may pass through or forward fetch command 702 to SIM card 510. SIM card 510 may respond with a set-up-menu command 706 that includes a list of features of SIM card 510 to be included in the user menu of mobile device 515. Upon receiving set-up-menu command 706 from SIM card 510, cryptographic label 501 can add its own list of user selectable features to the features of SIM card 510 listed in set-up-menu command 706, and generates a set-up-menu command 708 that lists the features of both SIM card 510 and cryptographic label 501. The list of features added by cryptographic label 501 can include, for example, mobile banking features such as a menu selection for making mobile payments, a menu selection for making mobile money transfer, a menu selection for a financial account inquiry, a menu selection for making a contactless payment, and/or other menu selections for services related to financial or banking transactions that a user can perform using mobile device 515 equipped with cryptographic label 501. Cryptographic label 501 then sends set-up-menu command 708 that includes the list of features of both SIM card 510 and cryptographic label 502 to mobile device 515. In response to receiving set-up-menu command 708, mobile device 515 adds the list of features of SIM card 510 and cryptographic label 501 to the user menu of mobile device 515.

Mobile device 515 can send a terminal response 710 towards SIM card 510 to indicate that the user menu is set up successfully. Upon receiving terminal response 710, cryptographic label 501 passes through or forwards terminal response 710 to SIM card 510. SIM card 510 may reply with a response 712 indicating acknowledgement of terminal response 710 towards mobile device 515. Cryptographic label 501 then passes through or forwards response 712 to mobile device 515. Mobile device 515 can then display to a user the features and services that cryptographic label 501 can provide on mobile device 515, and the user can select one or more features of cryptographic label 501 from the user menu of mobile device 515 to send secure communication to perform various financial and/or banking transactions. A user can also select non-secure features of SIM card 510, for example, to send unencrypted SMS messages, from the user menu of mobile device 515.

Figure 8:
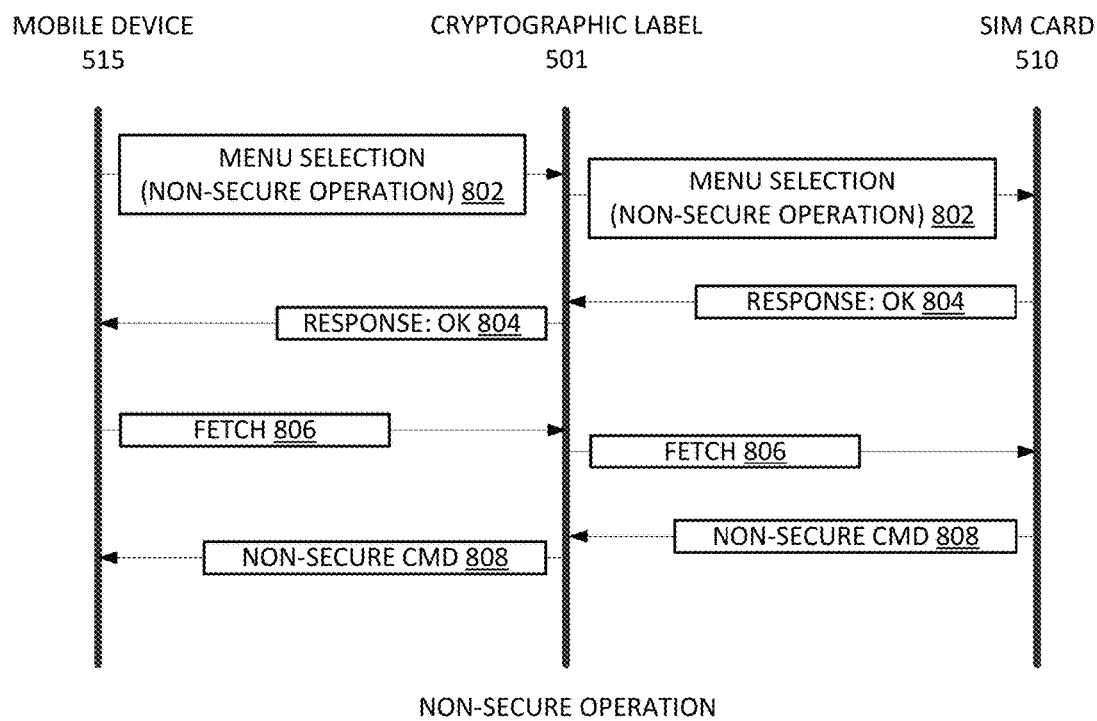
FIG. 8 illustrates a diagram showing the process of performing a non-secure operation in a communication device equipped with a cryptographic expansion device, according to one embodiment of the present invention.

FIG. 8 illustrates a non-secure operation being performed with mobile device 515 using SIM card 510, according to one embodiment. When a user selects a feature of SIM card 510 to perform a non-secure operation (e.g., send unencrypted SMS, or display a message stored on SIM card 510, etc.) from the user menu of mobile device 515, mobile device 515 sends a menu selection command 802 indicating the selection of the non-secure operation towards SIM card 510. Upon receiving menu selection command 802, cryptographic label 501 determines that the menu selection command 802 is requesting a feature of SIM card 510. Cryptographic label 501 then passes through or forwards menu selection command 802 to SIM card 510. In response to receiving menu selection command 802, SIM card 510 sends a response 804 towards mobile device 515 to indicate the menu selection command 802 has been received. SIM card 510 processes menu selection command 802 and prepares one of more device commands to send to mobile device 515 to carry out the non-secure operation being requested.

Upon receiving response 804 indicating menu selection command 802 has been received by SIM card 510, cryptographic label 501 passes through or forwards response 804 to mobile device 515. Mobile device 515 may then send a fetch command 806 towards SIM card 510 to obtain any pending commands that SIM card 510 wants mobile device 515 to perform to carry out the non-secure operation selected by the user. Upon receiving fetch command 806, cryptographic label 501 passes through or forwards fetch command 806 to SIM card 510. SIM card 510 responds to fetch command 806 by sending a device command 808 towards mobile device 515 to instruct mobile device 515 to perform one or more functions of mobile device 515 to carry out the non-secure operation. For example, device command 808 may instruct mobile device 515 to send an unencrypted SMS over the cellular interface of mobile device 515, or display a stored SMS message on the screen of mobile device 515. Upon receiving device command 808 from SIM card 519, cryptographic label 501 passes through or forwards device command 808 to mobile device 515. Mobile device 515 then executes device command 808 to carry out the non-secure operation requested by the user.

Figure 9:
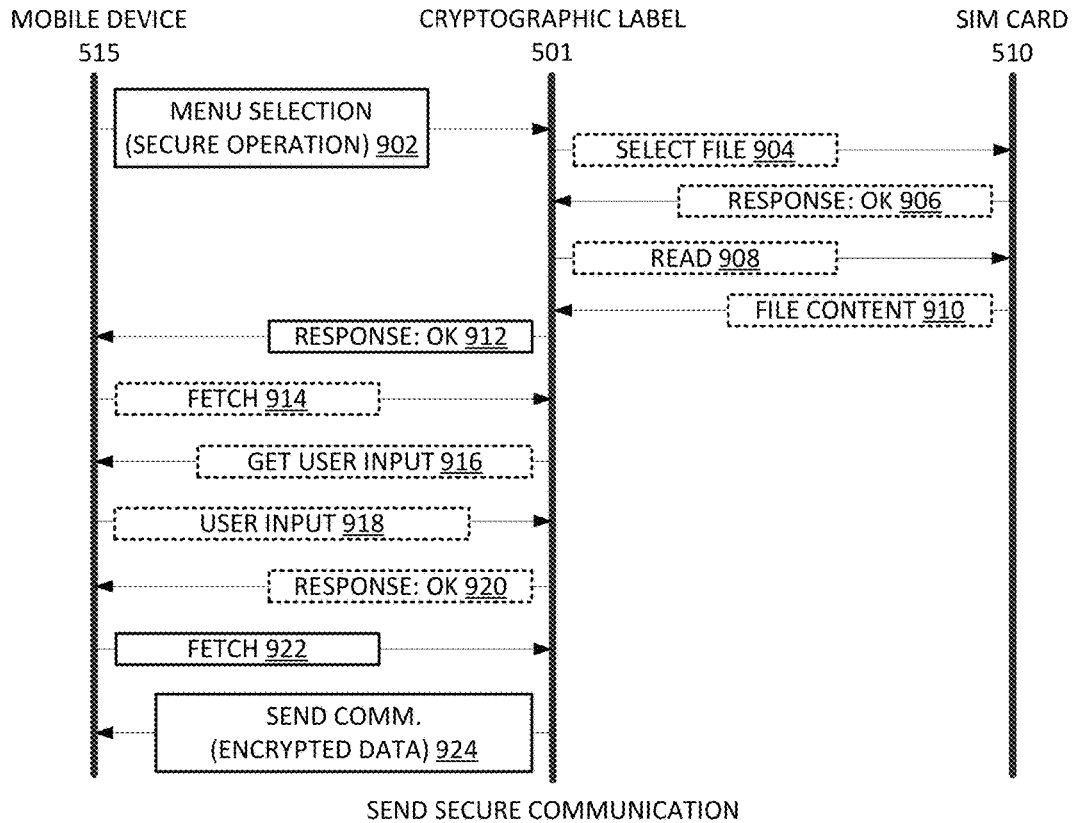
FIG. 9 illustrates a diagram showing the process of performing a secure operation in a communication device equipped with a cryptographic expansion device, according to one embodiment of the present invention.

FIG. 9 illustrates a secure communication being sent from mobile device 515 using cryptographic label 501, according to one embodiment. When a user selects a secure application such as a mobile banking application in cryptographic label 501 from the user menu of mobile device 515 to perform a secure operation such as a financial and/or banking transaction, for example, to make a mobile payment or to check an account balance, mobile device 515 sends a menu selection command 902 indicating the secure operation the user wants to perform to cryptographic label 501. Upon receiving menu selection command 902, cryptographic label 501 determines that the menu selection command 902 is requesting a secure application of cryptographic label 501 to perform a secure operation.

Depending on the secure operation selected by the user, cryptographic label 501 may optionally retrieve information stored in cryptographic label 501 such as an encrypted PIN to carry out the secure operation. In some embodiments, certain information stored in SIM card 510 may also be used to carry out the secure operation. For example, the secure operation may include sending a secure communication from mobile device 515 to a recipient device, and the unique serial number (ICCID) of SIM card 510 and/or the international mobile subscriber identity (IMSI) of SIM card 510 may be included in the secure communication to verify the identity of the SIM card holder. In such embodiments, cryptographic label 501 may optionally send a select file command 904 to SIM card 510 to access the designated file storing the information in SIM card 510. In response to receiving select file command 904, SIM card 510 sends a response 906 to cryptographic label 501 indicating the designated file has been selected and is ready to be read. Cryptographic label 501 then sends a read command to 908 to SIM card 510 to read the information from the designated file. In response to read command 908, SIM card sends file content 910, for example, the ICCID and/or IMSI of SIM card 510, to cryptographic label 501.

Next, cryptographic label 501 sends a response 912 to mobile device 515 to acknowledge that the menu selection command 902 was received. Mobile device 515 then sends a fetch command 914 to cryptographic label 501 to obtain any pending commands that cryptographic label 501 wants mobile device 515 to perform to carry out the secure operation. In some embodiments, depending on the secure operation selected by the user, in response to receiving fetch command 914, cryptographic label 501 may optionally send a display command (not shown) to mobile device 515 to instruct mobile device 515 to prompt a user for input on the display screen of mobile device, for example, to prompt the user to enter a PIN, account information, payment recipient information, or other information related to the secure operation being performed. When the user enters the requested information on the user interface of mobile device 515, mobile device 515 sends a user-input-event command (not shown) to cryptographic label 501 to notify cryptographic label 501 that user input has been received. Cryptographic label 501 can then send a get-user-input command 916 to mobile device 515 to request the user input. In response, mobile device 515 sends the user input 918 to cryptographic label 501. Cryptographic label 501 may perform cryptographic operations on the user input such as encrypting the user input using any of the encryption algorithms stored in cryptographic label 501, or generate a MAC or hash of the user input. Cryptographic label 501 sends a response 920 to mobile device acknowledging the user input has been received.

Mobile device 515 may send another fetch command (not shown) to cryptographic label 501 to obtain further device commands that cryptographic label 501 wants mobile device 515 to execute to carry out the secure operation. Thus, mobile device 515 and cryptographic label 501 can optionally exchange a series of fetch commands and device commands in response to those fetch commands to instruct mobile device 515 to perform various functions to carry out the secure operation selected by the user. Furthermore, depending on the secure operation selected by the user, the information that cryptographic label 501 may request or use to carry out the secure operation is not just limited to user input. For example, cryptographic label 501 may send commands to mobile device 515 to instruct mobile device 515 to retrieve information using any of the interfaces of mobile device 515. Cryptographic label 501 may instruct mobile device 515 to obtain location information from a global positioning system interface of mobile device 515. Cryptographic label 501 may request information received from an external NFC device through a NFC interface of mobile device 515. Cryptographic label 501 may instruct mobile device 515 to retrieved information from the internet through a wireless data interface of mobile device 515, and so on. Cryptographic label 501 may perform additional cryptographic operations on any information obtained from the various interfaces of mobile device 515.

Once cryptographic label 501 has obtained and performed the desired cryptographic operations on the information (e.g., account numbers, transaction amount, etc.) that cryptographic label 501 will use to carry out the secure operation, in response to a fetch command 922 received from mobile device 515, cryptographic label 501 can transmit a send communication command 924 with an encrypted message that includes any of the information described above to mobile device 515. The send communication command 924 can instruct mobile device 515 to transmit an encrypted message provided by cryptographic label 501 using any of the communication interfaces available on mobile device 515. For example, the send communication command 924 may instruct mobile device 515 to send a secure SMS message with encrypted data provided by cryptographic label 501 to a server to make a mobile payment or to check account balance. The send communication command 924 may instruct mobile device 515 to send a secure USSD message with encrypted data to start a USSD two-way communication session with a banking server. The send communication command 924 may also instruct mobile device 515 to send a secure NFC or RF communication with encrypted data via the NFC or RF interface of mobile device 515 to a NFC or RF enabled recipient device such as a point-of-sale (POS) terminal. Because the information that mobile device 515 transmits out in the secure communication is provided to mobile device 515 in an encrypted format by cryptographic label 501, the secure communication is already encrypted when it leaves the communication interface of mobile device 515. In this manner, secure encrypted end-to-end communication can be maintained between mobile device 515 and a recipient device.

Figure 10:
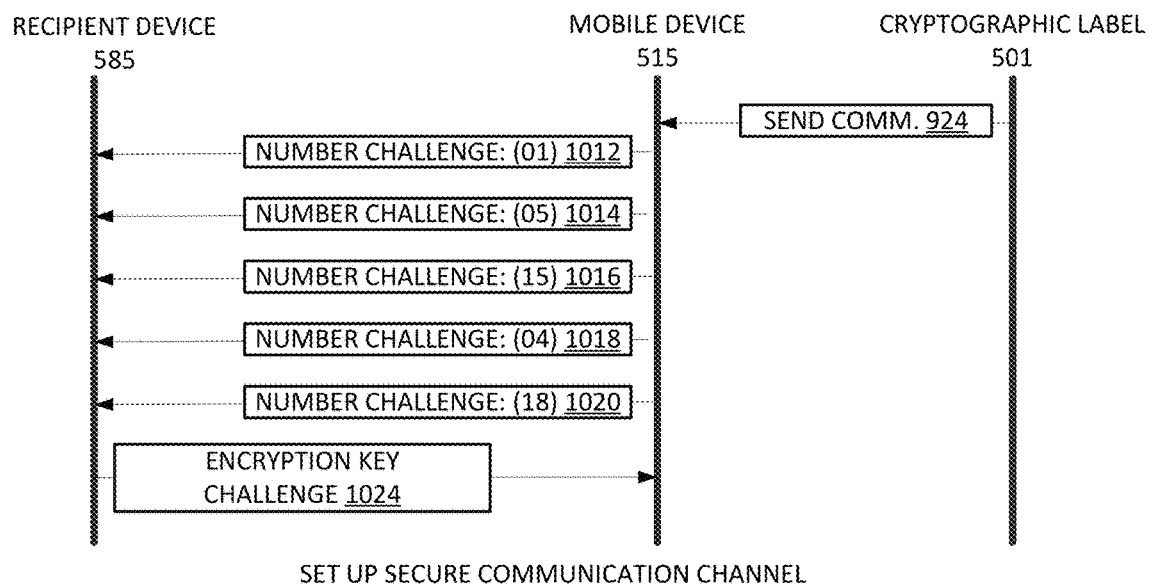
FIG. 10 illustrates a diagram showing the process of setting up a secure communication channel between devices using a cryptographic expansion device, according to one embodiment of the present invention.

Referring now to FIG. 10, in some embodiments, the send communication command 924 may instruct mobile device 515 to send a series of messages to a recipient device 585 to set up a secure communication channel or tunnel. The series of messages 1012-1020 can be used to verify the identity of recipient device 585 and to verify the identity of mobile device 515 to recipient device 585. This way of verifying the identities of the communicating devices can be especially useful with NFC and/or RF communications where the identity of the recipient device 585 may not be known to mobile device 515 prior to the communication. The series of messages 1012-1020 can be a number challenge that includes a specific sequence of numbers that is only known to mobile device 515 as provided by cryptographic label 501, and only known to authorized recipient devices that are allowed to communicate with mobile device 515.

When recipient device 585 first receives message 1012, recipient device 585 does not initially respond to message 1012. Recipient device 585 will not respond until all messages 1012-1020 has been received by recipient device 585, and the number sequence transmitted in messages 1012-1020 is confirmed to be a valid and correct sequence. Thus, recipient device 585 can verify the identity of mobile device 515 based on the number challenge received in the series of messages 1012-1020. Mobile device 515 can also use the number challenge to verify the identity of recipient device 585. For example, if a recipient device response to message 1012, mobile device 515 can determine that the recipient device is not an authorized recipient device because an authorized recipient device would not respond right away to message 1012. It should be appreciated that the series of messages 1012-1020 is not limited to five messages as shown, and can include any number of messages, and that the number challenge can be any sequence of numbers, sequence of alphanumeric characters, or sequence of other types of messages. Furthermore, in other embodiments, mobile device 515 equipped with cryptographic label 501 can act as a recipient device and be on the receiving end of a number challenge.

In some embodiments, to provide an additional level of security to verify the identity of the devices, recipient device 585 can respond to the reception of a valid and correct number challenge with an encryption key challenge 1024. The encryption key challenge 1024 can be a symmetric key challenge or an asymmetric key challenge. In the encryption key challenge 1024, recipient device 585 can send a random number to mobile device 515 to request mobile device 515 to encrypt the random number with an encryption key that would only be known to an authorized device. Mobile device 515 can send the random number to cryptographic label 501 and request cryptographic label 501 to encrypt the random number using the requested encryption key stored in cryptographic label 501. Cryptographic label 501 can respond to mobile device 515 with the encrypted random number, and mobile device 515 then sends the encrypted random number to recipient device 585. Recipient device 585 then decrypts the encrypted random number with a corresponding key, which can be a symmetric key or an asymmetric key. If the decryption results in the random number that recipient device 585 has previously sent to mobile device 515, then recipient device can be further assured that mobile device 515 equipped with cryptographic label 501 is an authorized device, and a secure communication channel or tunnel can be established between mobile device 515 and recipient device 585. Exchange of sensitive information with secure communications between the two devices can then proceed.

One advantage of the being able to verify the identities of the communicating devices using cryptographic label 501 as describe above is that the number sequence of the number challenge and the encryption key used in the encryption key challenge can be provisioned to be unique for each cryptographic label, and thus can be provisioned to be user specific. If the number sequence and/or the encryption key used in the encryption key challenge is somehow compromised, the infiltration will be isolated to a single user, and the remaining user base of the mobile network will not be compromised. The affected user's keys can be changed without impacting the configuration of the remaining user base.

Figure 11:
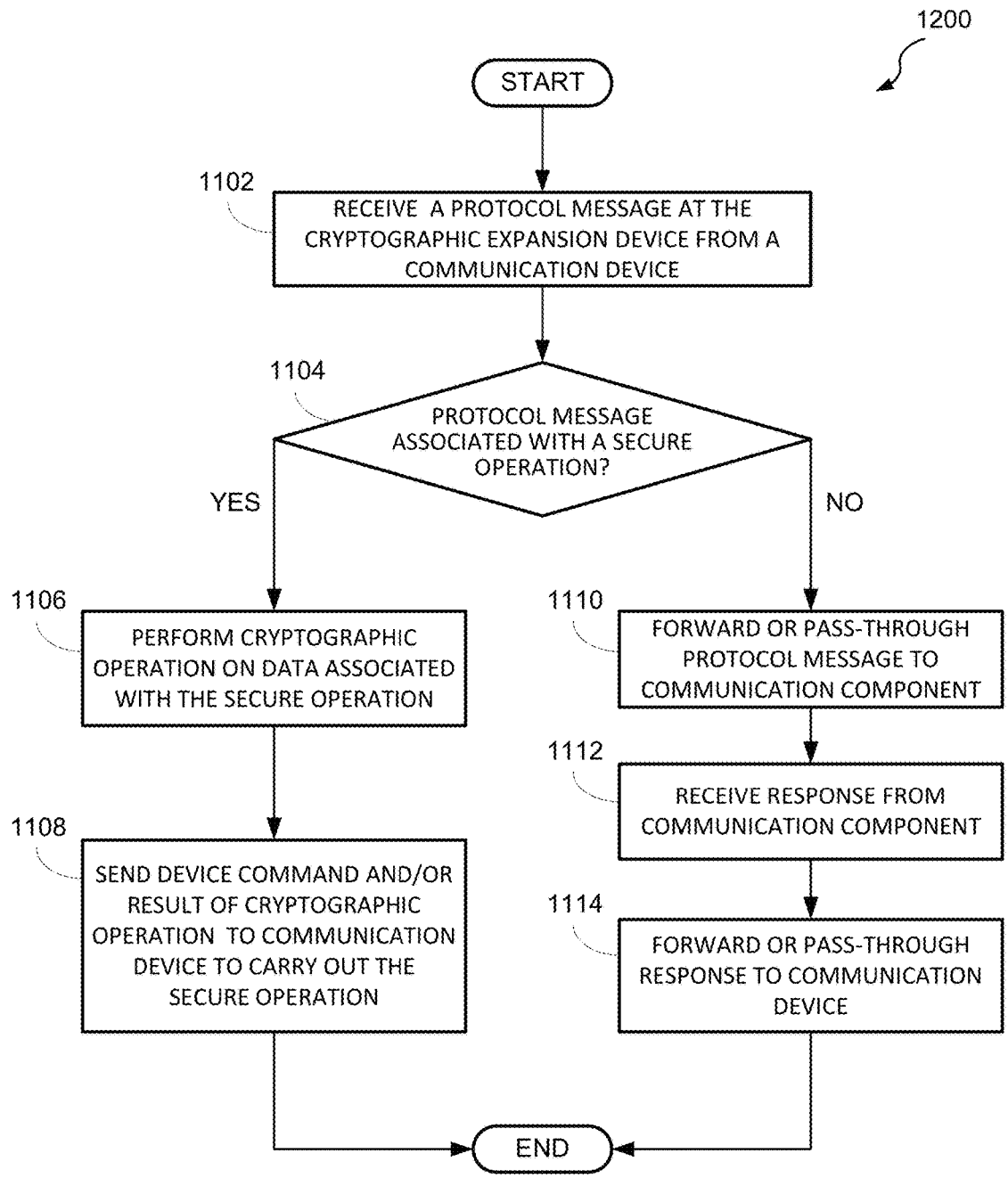
FIG. 11 illustrates a flow diagram of performing a secure operation with a cryptographic expansion device, according to one embodiment of the present invention.

FIG. 11 illustrates a flow diagram for enabling transmission of secure communications from a communication device (e.g., mobile device 515 of FIG. 5) using a cryptographic expansion device (e.g., cryptographic label 501 of FIG. 5) attached to a communication component (e.g., SIM card 510 of FIG. 5) of the communication device, according to various embodiments. The cryptographic expansion device can be in the form of a label that includes a first electrical contact plate and a second electrical contact plate. The cryptographic expansion device is attached to the communication component of the communication device via one of the electrical contact plates, for example, the second electrical contact plate. The cryptographic expansion device also includes an embedded cryptographic processor to perform cryptographic operations.

At block 1102, the cryptographic expansion device receives a protocol message from the communication device according to a communication protocol that the communication device uses to communicate with the communication component. The protocol message can be a command or information that is associated with a secure operation to be performed by the cryptographic expansion device. For example, the protocol message can be a command associated with a request from a user to perform a financial or banking transaction using a secure application stored in the cryptographic expansion device such as a mobile banking application or a contactless payment application. The financial or banking transaction can be a mobile payment, a mobile money transfer, an account balance inquiry, or other financial or banking transactions or account inquiries, and may involve sending or receiving a secure communication. The protocol message can also be a command or information associated with a non-secure operation that is intended for the communication component of the communication device. In some embodiments, the protocol message can include a flag or a protocol identification (ID) field to indicate whether the protocol message is intended for the communication component.

At block 1104, the cryptographic expansion device determines if the protocol message is associated with a secure operation. If the cryptographic expansion device determines that the protocol message involves a secure operation to be performed by the cryptographic expansion device, for example, by examining the flag or the protocol ID of the protocol message, then at block 1106, using the embedded cryptographic processor, the cryptographic expansion device processes the protocol message and performs a cryptographic operation on data or information associated with the secure operation as indicated by the protocol message. The data or information can be data or information that is stored in the cryptographic expansion device and/or in the communication component, or data or information such as user input or other information that is obtained from an interface of the communication device. For example, to carry out a secure operation such as sending a secure communication to perform a financial or banking transaction, the cryptographic expansion device may retrieve an encrypted PIN from the cryptographic expansion device, obtain subscriber information from the communication component, and/or obtain user input from the communication device such as a PAN or a portion of a PAN entered by a user on the user interface of the communication device. The data or information associated with the secure operation can also be embedded in the protocol message received from the communication device. For example, the protocol message received from the communication device can include an encrypted communication for the cryptographic expansion device to decrypt.

To perform the cryptographic operation on data or information associated with the secure operation, the cryptographic expansion device may select a suitable encryption and/or MAC or hash algorithm stored in the cryptographic expansion device. The cryptographic expansion device then retrieves a cryptographic or encryption key associated with the selected encryption, and performs a cryptographic operation such as encrypting or decrypting the data or information associated with the secure operation using the encryption key and selected algorithm. The cryptographic expansion device may also generate or verify a MAC or hash on data or information associated with the secure operation.

Then at block 1108, the cryptographic expansion device sends a device command and/or the result of the cryptographic operation (i.e. processed data such as encrypted or decrypted data) to the communication device in accordance with the protocol of the protocol message. The processed data or device command can be sent from the cryptographic expansion device to the communication device, for example, via the first electrical contact plate of the cryptographic expansion device. The device command can include commands instructing the communication device to perform certain operations to carry out the secure operation such as sending encrypted data provided by the cryptographic expansion device in a secure communication on a communication interface of the communication device. In some embodiments, the communication interface can be a cellular interface for sending SMS or USSD messages, or a NFC or RF interface for sending NFC or RF communications. In other embodiments, the communication interface can be any of the communication interfaces provided in the communication device. As another example, the device command can instruct the communication device to display plaintext data or information to a user that the cryptographic expansion device decrypted from an encrypted message sent to the communication device. It should be understood that depending on the secure operation that is being requested or associated with the protocol message received from the communication device in block 1012, the cryptographic expansion device may send more than one device command to the communication device to carry out the secure operation, and that in some embodiments, there can be multiple iterations of protocol message and device command exchanges to carry out a secure operation.

Referring back to block 1104, if the cryptographic expansion device determines that the protocol message is associated with a non-secure operation that is intended for the communication component, then at block 1110, the cryptographic expansion device forwards or passes through the protocol message to the communication component. At block 1112, the communication component may reply to the cryptographic expansion device with a response to the protocol message. Upon receiving the response to the protocol message from the communication component, at block 114, the cryptographic expansion device forwards or passes through the response to the communication device.

It should be appreciated that while the methods and apparatuses for sending and receiving secure communications discussed above have been described with reference to performing financial and/or banking transactions from a mobile device, the methods and apparatuses discussed above can also be used to perform secure communications from a mobile device for other applications as well, such as personal or corporate secure communication (e.g., for sensitive or confidential communications to avoid industrial espionage), health care communication (e.g., for confidential medical information or electronic prescription delivery), or governmental agency communication (e.g., for law enforcement).

Figure 12:
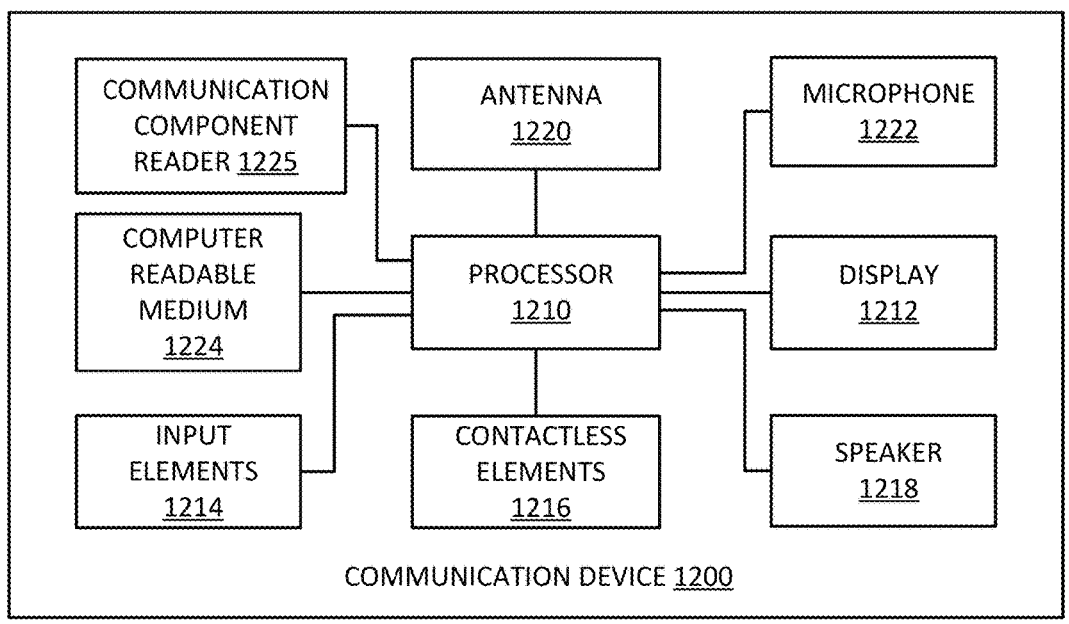
FIG. 12 illustrates a block diagram of a communication device, according to one embodiment of the present invention.

FIG. 12 shows a communication device 1200 according to the some of the embodiments described above. The communication device 1200 includes a communication component reader 1225 for accepting a communication component such as a SIM card that may be equipped with a cryptographic expansion device. The communication device 1200 also includes a display 1212, an input element 1214, computer readable medium 1224 such as volatile and non-volatile memory, processor 1210 and at least one antenna 1220. In addition, the communication device 1200 may include a dual interface including both contact (not shown) and contactless interface 1216 for transferring information through direct contact or through an integrated chip, which may be coupled to a second antenna. In addition, the communication device 1200 may be capable of communicating through a cellular network, such as GSM through an antenna 1220. Thus, the communication device 1200 may be capable of transmitting and receiving information wirelessly through both short range NFC, radio frequency (RF) and cellular connections.

In certain implementations, individual blocks (or steps) described above with respect to the Figures may be combined, eliminated, or reordered. Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A device comprising:
   a first set of electrical contacts for interfacing to a communication device;
   a second set of electrical contacts for interfacing to a communication component; and
   a substrate including a hardware security module coupled to the first set of electrical contacts and the second set of electrical contacts,
   wherein the hardware security module includes a secure processing unit and a public processing unit,
   wherein the public processing unit includes a communication device interface coupled to the first set of electrical contacts, and a communication component interface coupled to the second set of electrical contacts, and
   wherein the public processing unit is configured to:
   process messages received at the communication device interface and the communication component interface;
   send requests to perform cryptographic operations to the secure processing unit in response to receiving messages on the communication device interface that are associated with secure operations; and
   pass through messages that are associated with non-secure operations between the communication device interface and the communication component interface.

2. The device of claim 1, wherein the secure processing unit responds to encryption and decryption requests only when the encryption and decryption requests are from the public processing unit.

3. The device of claim 1, wherein the secure processing unit is accessible to both the communication component and the communication device only through the public processor unit.

4. The device of claim 1, wherein the secure processing unit includes a secure memory, and the public processing unit includes a memory that is separate from the secure memory.

5. The device of claim 1, wherein the secure processing unit enables the communication device to perform cryptographic operations that are otherwise not available to the communication device.

6. The device of claim 1, wherein the secure processing unit includes a cryptographic key storage that is provisioned during manufacturing of the device.

7. The device of claim 6, wherein the cryptographic key storage cannot be altered by an external source without a master key.

8. The device of claim 6, wherein contents of the cryptographic key storage are not transmitted outside of the secure processing unit.

9. The device of claim 1, further comprising a coupling element to couple the device to the communication component.

10. The device of claim 9, wherein the coupling element is an adhesive.

11. The device of claim 9, wherein the coupling element is configured to mechanically couple the device to the communication component.

12. The device of claim 1, wherein the communication component is a subscriber identity card.

13. The device of claim 1, wherein the communication component is a memory card.

14. A system comprising:
   a communication component; and
   a cryptographic expansion device coupled to the communication component, the cryptographic expansion device comprising:
   a first set of electrical contacts for interfacing to a communication device;
   a second set of electrical contacts for interfacing to the communication component; and
   a substrate including a hardware security module coupled to the first set of electrical contacts and the second set of electrical contacts,
   wherein the hardware security module includes a processor and a cryptoprocessor,
   wherein the processor includes a communication device interface coupled to the first set of electrical contacts, and a communication component interface coupled to the second set of electrical contacts, and
   wherein the processor is configured to:
   process messages received at the communication device interface and the communication component interface;
   send requests to perform cryptographic operations to the cryptoprocessor in response to receiving messages on the communication device interface that are associated with encryption or decryption operations; and pass through messages that are associated with non-secure operations between the communication device interface and the communication component interface.

15. The system of claim 14, wherein the cryptoprocessor is configured to respond only to the requests to perform the cryptographic operations that are received from the processor of the cryptographic expansion device.

16. The system of claim 14, wherein the communication component is a communication card.

17. The system of claim 16, wherein the system including the communication component and the cryptographic expansion device is insertable into a communication card receiving slot of a communication device.

18. The system of claim 17, wherein the cryptographic expansion device is configured to use a communication interface of the communication device to transmit encrypted data.

19. The system of claim 14, wherein the cryptographic expansion device is configured to destroy cryptographic keys stored in the cryptographic expansion device when the cryptographic expansion device is removed from the communication component.

* * * * *